(12) United States Patent
Bennett

(10) Patent No.: US 9,378,135 B2
(45) Date of Patent: Jun. 28, 2016

(54) METHOD AND SYSTEM FOR DATA STORAGE

(71) Applicant: VIOLIN MEMORY INC., Santa Clara, CA (US)

(72) Inventor: Jon C. R. Bennett, Sudberry, MA (US)

(73) Assignee: VIOLIN MEMORY INC., Santa Clara, CA (US)

( * ) Notice: Subject to any disclaimer, the term of this patent is extended or adjusted under 35 U.S.C. 154(b) by 119 days.

(21) Appl. No.: 14/149,993

(22) Filed: Jan. 8, 2014

(65) Prior Publication Data

US 2014/0195725 A1 Jul. 10, 2014

Related U.S. Application Data

(60) Provisional application No. 61/750,133, filed on Jan. 8, 2013.

(51) Int. Cl.
*G06F 12/06* (2006.01)
*G06F 12/02* (2006.01)

(52) U.S. Cl.
CPC ............ *G06F 12/0246* (2013.01); *G06F 12/06* (2013.01); *G06F 2212/7201* (2013.01); *G06F 2212/7205* (2013.01)

(58) Field of Classification Search
CPC .............. G06F 3/0688; G06F 12/0292; G06F 12/0246; G06F 12/06
USPC .......................................... 711/103, 202, 209
See application file for complete search history.

(56) References Cited

U.S. PATENT DOCUMENTS

| 2008/0082735 | A1* | 4/2008 | Shiga ............................ 711/103 |
| 2010/0153620 | A1 | 6/2010 | McKean et al. |
| 2012/0311237 | A1* | 12/2012 | Park .............................. 711/103 |
| 2014/0075096 | A1* | 3/2014 | Tanaka et al. ................. 711/103 |
| 2014/0173191 | A1* | 6/2014 | Mizushima ................... 711/103 |
| 2014/0365719 | A1* | 12/2014 | Kuzmin et al. ............... 711/103 |
| 2015/0254005 | A1* | 9/2015 | Calvert et al. ................ 711/103 |

FOREIGN PATENT DOCUMENTS

EP 1 927 920 A2 4/2007

OTHER PUBLICATIONS

Search Report and Written Opinion in related PCT Application No. PCT/US2014/010624 mailing date May 26, 2014.
European Search Report for related European application No. PCT/US2013/036770 Mailing Date Oct. 15, 2015 (6 pgs).

* cited by examiner

*Primary Examiner* — Than Nguyen
(74) *Attorney, Agent, or Firm* — Brinks Gilson & Lione

(57) ABSTRACT

A system and method of storing data in a semiconductor-type non-volatile memory is described, where a physical storage address of data is made available to a user application such as a file system and where characteristics of the memory system that may be allocated on a physical or a logical basis to a user are separately characterizable as to performance, size, redundancy, or the like. A read request to the memory system may be serviced by accessing the physical address included in the read request rather than using a logical-to-physical address lookup in the memory system. Garbage collection operations may be performed on a virtual-physical-block basis to preserve the relationship between the physical address known to the user and the actual physical location of the data.

21 Claims, 9 Drawing Sheets

METHOD AND SYSTEM FOR DATA STORAGE

The present application claims the benefit of priority to U.S. provisional application No. 61/750,133, filed on Jan. 8, 2013, entitled "Method and System for Data Storage" which is incorporated herein by reference.

BACKGROUND

The terms "memory system" and "storage system" are generally used interchangeably herein. Existing terminology is changing as more of the on-line and near-line data of large systems is being stored in solid state devices such as FLASH memory arrays or solid state disks (SSD) rather than rotating disk drives. A storage system was considered to be primarily disk based and having data retrieval and writing latencies dominated by the mechanical performance of the disk drive. Often the disks were connected to the processor through a network connection. Memory systems were considered to be either directly attached to the processor requiring the data, or having sufficiently low latency as to cause little bottleneck in the processing speed As the latency of FLASH memory arrays may be considerably less than that of disks, while the storage capacity and economics of such arrays is beginning to compete directly with disk-based systems, the distinction between a "memory system" and a "storage system" is somewhat blurred. Here we use the terms to describe a solid-state memory system, whether connected to the using server directly or through some network connection.

The term SSD may mean a plugable module having a form factor and interface protocol that is compatible with an industry standard. As such industry standards change, from time-to-time, there is no suggestion herein that the characteristics of a SSD, either in a physical or electrical sense, would not be similarly altered by a manufacturer. The term SSD may also be used to describe any semiconductor memory system having persistent storage characteristics, regardless of the memory technology, form factor, or interface protocol as such devices may represent a stage of evolution of industry standards or storage technology.

The term "logical address" when used, for example, as the logical block address (LBA) should be understood as the address space presented to or used by a user program, server, file system, or the like, to represent the data that is stored in the memory system. The term "physical address" when used, for example, as the physical block address (PBA) should be understood as the address space presented by or used by the memory system so as to locate the data that is stored in the memory system. The terms LBA and PBA may represent the end points of a process having multiple levels of indirection such that the LBA and the information stored in the PBA are uniquely related thereby.

In a SSD having FLASH memory as the persistent storage on non-volatile storage, the relationship between the logical block address (LBA) as furnished to the SSD by a user and the physical block address (PBA) where the information is stored in the SSD may be maintained by a function known as the flash translation layer (FTL). An indirection table, such as a L2P table may be stored at the SSD providing for this relationship, which may change autonomously as the FTL performs such overhead functions as garbage collection and wear leveling, as is known in the art. As such, the physical address space is not exposed to the user.

The term PBA may be used as an acronym for the physical (block) address in a memory system where the data referenced by an LBA is stored. Typically a page of data having an LBA is associated with a physical page having the same data size as the LBA data size and associated metadata. The metadata associated with the LBA and the PBA may share some common attributes, but may serve functions associated with either the logical or stored aspects of the data and may therefore have different sizes and fields. Metadata of the logical and physical representations of the data may have some common attributes that are stored or computed so as to validate access to the data, ensure the validity of the data, or the like.

Confusion may arise as there is an additional use of the term "block" in describing the operation of a FLASH memory system. Architecturally a FLASH memory circuit may be comprised of a plurality of physical pages of a size, (e.g. 2 KB), each storing the corresponding quantity of data referenced by a LBA and organized as "blocks". A block may comprise, for example, 256 pages. NAND FLASH memory circuits that are currently available have the property that individual pages of a block cannot be erased; the whole block is erased if any of the pages of the block are to be erased. Moreover, the pages of each block are written in monotonic order and if a page is skipped, the page cannot be subsequently written prior to erasure of the entire block. When a block comprising a plurality of pages is being described herein, a person of skill in the art would understand the distinction between such a block comprising a fixed multiple of pages, and the PBA representing a specific page within a block. In some contexts, the term "physical address" is used and this term may refer to either a block or a PBA. Blocks comprising pages of physical addresses may be described as having a block address or block number and such addresses may be pre-assigned or be virtualized. In some situations, the physical address may comprise, for example, a block number and a physical page address within the block.

Inevitably the terminology of legacy disk technology and that of solid state memory systems, such as a FLASH memory array conflicts, particularly in the definition of sector, page, block and the like. So, sectors have a logical block address (LBA) when the storage is visualized from a legacy standpoint, as is typical of most existing virtualization approaches, whereas internal operations of the solid state memory system may treat a block as a large number of pages (e.g., 128 LBAs) each page comprising a number (e.g., 4) of sectors having a size (e.g., 512b). Just as the firmware or software of the memory system needs to accommodate these constructs, a person of skill in the art would appreciate the meaning and use of the terminology at the present state of the art and would adapt the concepts accordingly.

FLASH memory devices may be characterized, for example, as single level cell (SLC), multiple level cell (MLC) or triple level cell (TLC), representing the storage of one bit, two bits or three or more bits of data in each cell of the memory device. While the speeds, storage capacity, and durability of the devices differ, the disclosure herein is applicable to any of these types of memory as well as other solid state memory technologies that exist or may subsequently be developed.

SUMMARY

A device and method for storing digital data is disclosed, the device having a processor having a nonvolatile semiconductor memory, organized as blocks, where each block has a plurality of physical locations where a data is storable. The device may have a volatile memory used as a buffer or a cache and a data interface for communicating with a user or host.

In an aspect, the processor may be configured to receive commands and data through the data interface and to manage the storage of data in the nonvolatile semiconductor memory. A command to read data received from a user may be evaluated to determine the type of read or write command and associated parameters of data.

For read commands, the commands may be, for example, a first type of read data command or a second type of read data command. Commands may be distinguished based on a command identifier, or by the arguments associated with the commands.

In an aspect, a read data command is of the first type when the command includes a logical address and does not include a physical address; and the read data command is of the second type when the command includes at least a physical address at which the data is stored in memory.

Responsive to the first type of read data command, the physical address of the data is determined using by, for example an indirection table such as may be associated with a Flash Translation Layer (FTL) which may be a form of logical-to-physical association table (L2P). Date would be retrieved from the physical address in the non-volatile memory and returned to the user.

Responsive to the second type of read command, data may be retrieved from the physical address in the non-volatile memory and returned to the user. The L2P table, for example, may not need to be traversed, however, if there is further indirection of addressing so as to, for example, facilitate garbage collection, a physical virtualization table may exist. This table may be used by the L2P table as well. The tables are generally maintained in volatile memory such as the buffer memory of the non-volatile memory device for access speed, but they are typically checkpointed to preserve the data during a shutdown, or otherwise reconstructed at a system startup.

In order to maintain data integrity the user may supply metadata in conjunction with the read command, and the processor compares at least a portion of the metadata received with metadata associated with the data read from the non-volatile memory. Such data may be explicit or may be metadata derived from the stored data, and may also identify attributes of the portion of the memory system in which the data is stored. Where the supplied metadata and the read metadata are a match, the read data is returned to the user. Otherwise an error case is processed.

In still another aspect the processor is programmed so as to interpret a command to write data from a user to determine whether the write command is, for example, a first type or a second type. A write command may be of the first type when the command includes a logical address, but does not include a physical address where the data is to be stored and the write command is of the second type when the command includes at least a physical address at which the data is stored in non-volatile memory.

In response to receiving the first type of write command, the physical address in the non-volatile memory where data associated with the first type of write command is to be stored is determined in accordance with a protocol and the physical address is associated with the logical address in an indirection table.

In response to the second type of write command, determine a physical address in the non-volatile memory where data associated with the second type of write command is to be stored, in accordance with a protocol, and include the physical address in a response message to the user and in an indirection table.

A portion of the metadata of the second write command may be compared with a relevant portion of the metadata previously stored at the physical location provided in the second write command so as to verify that the data being modified or obsoleted by the action of the command is actually the correct data. Where the metadata matches, the correct physical location of the data being replaced has been accessed and the processing may proceed. Else, an error case exists.

If the second type of write command includes a logical address, the logical address may be included in the metadata to be stored for the new location of the data supplied with the write command. However, where such logical address is not provided a logical address may be provided by the processor and returned as part of a response message to the user and this logical address may be stored as part of the metatdata for the newly stored data. The metadata may include, for example, at least one of the logical address, a hash of the data stored at the corresponding physical address, a sequence number, or a time value.

Where the non-volatile memory is comprised of a plurality of blocks having storage locations therein, a group of blocks may be associated with one of a logical address range or a physical address range so as to share common attributes such as RAID type, garbage collection protocol, or the like.

Other types of commands may be received and processed by the memory device, including a type of TRIM command which may operate to de-allocate either a physical or a logical extent of memory in the memory system. This would include designating the identified storage locations as obsolete and removing the entries from a L2P or other indirection table. A TRIM command may operate so as to delete data from a memory extent so as to permit a file system to manage this aspect of the storage process. As such, the TRIM command may include a base logical block address and an extent, a base logical block address and a number of storage locations, a base address and a bit map, or the like. The same approach can be used when obsoleting memory storage locations on a physical location basis. In these situations, the data is effectively abandoned and is subject to erasure during garbage collection operations. Since this operation depends on properly identifying the data locations to be invalidated, comparison of metadata may be performed at least on a block basis.

A method of managing the storage of data includes: providing a non-volatile memory device for storing data, the non-volatile memory device having a processor, volatile memory and non-volatile memory. In an aspect, the processor is configured for interpreting a received command to read data from a user to determine whether the read data command is a first type of read data command or a second type of read data command. The read data command is of the first type when the command includes a logical address and does not include a physical address; and the read data command is of the second type when the command includes at least a physical address at which the data is stored in memory.

Responsive to the first type of read data command, the processor performs the steps of determining the physical address of the data, retrieving data from the physical address in the non-volatile memory and returning the data to the user; or responsive to the second type of read command, the processor performs the steps of retrieving data from the physical address in the non-volatile memory and returning the data to the user. The relationship between the logical address and the physical address is maintained in an indirection table in the non-volatile memory device.

In an aspect, the step of retrieving the data may include a step of retrieving metadata for the retrieved data and comparing at least a portion of the metadata of the retrieved data with at least a portion of metadata in the first or the second type of read command.

In an aspect, the method may further include interpreting a command to write data from a user to determine whether the write command is a first type or a second type. The write command may be of the first type when the command includes a logical address and does not include a physical address where the data is to be stored and may be of the second type when the command includes at least a physical address at which the data is stored in memory.

Responsive to the first type of write command the processor may perform the steps of determining the physical address in the non-volatile memory where data associated with the first type of write command is to be stored, in accordance with a protocol, and associating the physical address with the logical address in an indirection table.

Responsive to the second type of write command the processor may perform the steps of determining a physical address in the non-volatile memory where data associated with the second type of write command is to be stored, in accordance with a protocol, and including the physical address in a response message to the user and in the indirection table.

The processor performs the steps of writing data associated with the first or the second type of write command to the non-volatile memory; and writing metadata associated with the first or the second type of write command to the non-volatile memory device.

In an aspect, the method includes performing a step of determining a physical address responsive to the second type of write command if the portion of the metadata of the second type write command matches the portion of the metadata stored at the physical address of the second type of write command. If the second type of write command includes a first logical address, using the first logical address as a portion of the metadata stored for the determined physical address or if the second type of write command does not include a first logical address, providing a second logical address associated with the determined physical address, in the response message to the user; and storing the second logical address as metadata for the data stored at the determined physical address.

In an aspect the metadata may include the logical address, a hash of the data stored at the logical address, a sequence number, a time value or the like.

The non-volatile memory may comprised of storage locations having physical addresses, groups of storage addresses comprising a block of memory, having the characteristic that a block of memory can be written once before being entirely erased. A plurality of blocks may form a group of blocks and the group of blocks are associated with one of a logical address range or a physical address range so as to provide the user with memory operational characteristics which may differ from address range to address range.

A method of garbage collection in a memory system is disclosed, including providing a memory system, including a non-volatile memory, volatile memory and a processor. The processor operates to maintaining a first indirection table associating logical addresses with physical addresses, the memory being organized as blocks having a plurality of physical addresses, where each physical address is characterized as being one of valid, obsolete or free;

Selecting a block of the plurality of blocks in accordance with a protocol and reading the data from valid storage locations of the selected block to a buffer in the volatile memory while maintaining an association of the valid data with the physical address within the block from which it has been read. Data that is to be written to the non-volatile memory is temporarily stored in a cache and the block is erased.

Performing a step of selecting a physical address for the data in the cache from the indirection table, in accordance with a protocol, such that the data in the cache is assigned physical addresses that are not the relative physical addresses of the data read from valid storage locations of the selected block.

Data in the buffer and data in the cache having assigned physical addresses are written to a block selected from a pool of blocks that have been erased to provide free physical storage locations. In an aspect, the data in the buffer and the data in the cache may be written back to the block that held the valid data after the block has been erased.

The physical address may be formed by a combination of a block address and the relative physical location within the block, so that selecting a erased block from the pool of blocks may be performed by exchanging a block address of the block from which the valid data had been read with a block address of the block selected from a pool of free blocks. In this manner, the final physical address of the data need not be exposed to the user.

DESCRIPTION

Figure 1:
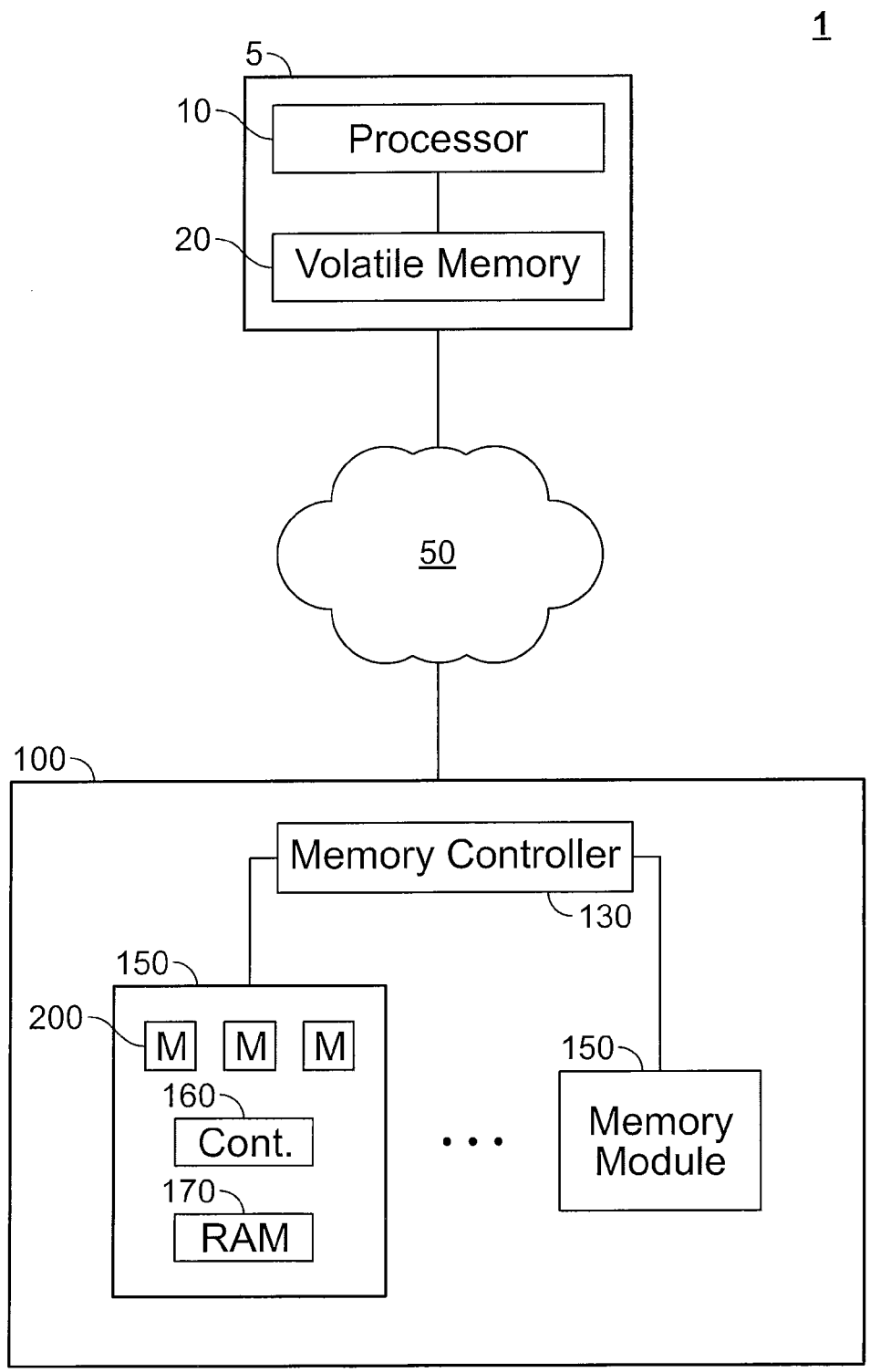
FIG. 1 is a block diagram of a memory system communicating with a user computer that may be configured to operate in accordance with a disclosed embodiment.

Exemplary embodiments may be better understood with reference to the drawings, but these embodiments are not intended to be of a limiting nature. Like numbered elements in the same or different drawings perform equivalent functions. Elements may be either numbered or designated by acronyms, or both, and the choice between the representation is made merely for clarity, so that an element designated by a numeral, and the same element designated by an acronym or alphanumeric indicator should not be distinguished on that basis.

It will be appreciated that the methods described and the apparatus shown in the figures may be configured or embodied in machine-executable instructions, e.g. software, or in hardware, or in a combination of both. The machine-executable instructions can be used to cause a general-purpose computer, a special-purpose processor, such as a DSP or array processor, or the like, that acts on the instructions to perform functions described herein. Alternatively, the operations might be performed by specific hardware components that may have hardwired logic or firmware instructions for performing the operations described, or by any combination of programmed computer components and custom hardware components, which may include analog circuits.

The methods may be provided, at least in part, as a computer program product that may include a tangible machine-readable medium having stored thereon instructions which may be used to program a computer (or other electronic devices) to perform the methods disclosed herein. For the purposes of this specification, the terms "machine-readable medium" shall be taken to include any physical medium that is capable of storing or encoding a sequence of instructions or data for execution by a computing machine or special-purpose hardware and that may cause the machine or special purpose hardware to perform any one of the methodologies or functions of the present invention. The term "machine-readable medium" shall accordingly be taken include, but not be limited to, solid-state memories, optical and magnetic disks, magnetic memories, and optical memories, as well as any equivalent device that may be developed for such purpose.

For example, but not by way of limitation, a machine readable medium may include read-only memory (ROM); random access memory (RAM) of all types (e.g., S-RAM, D-RAM. P-RAM); programmable read only memory (PROM); electronically alterable read only memory (EPROM); magnetic random access memory; magnetic disk storage media; flash memory, which may be NAND or NOR configured; memory resistors; or electrical, optical, acoustical data storage medium, or the like. A volatile memory device such as DRAM may be used to store the computer program product, provided that the volatile memory device is part of a system having a power supply and that the power supply or a battery provides power to the circuit for the time period during which the computer program product is stored on the volatile memory device or used by the using device.

Furthermore, it is common in the art to speak of software, in one form or another (e.g., program, procedure, process, application, module, algorithm or logic), as taking an action or causing a result. Such expressions are merely a convenient way of saying that execution of the instructions of the software by a computer or equivalent device causes the processor of the computer or the equivalent device to perform an action or a produce a result, as is well known by persons skilled in the art.

FIG. 1 is a representative system architecture for a computing system 1. A host computer 5 has a processor 10 and local cache memory 20. The local cache memory 20 is typically a volatile memory having random-access properties and substantially constant time response, such as DRAM or SRAM. However the local cache memory 20 may also include a FLASH memory component to provide high-speed access to frequently used data and programs and to provide such other functions as de-duplication so as to reduce the need to store redundant data, data compression or the like. The FLASH memory may be on the motherboard of the host computer 5 or be a plug in module, using a high speed interface such as PCIe.

The FLASH memory may have a form factor corresponding to conventional FLASH disks emulating conventional rotating media disks, or other form factor or connectivity. The host computer 5 and the FLASH memory may be in different enclosures or the same enclosure, without departing from the concepts described herein. Where the term SSD is used, there is not an intention to specify a form factor, interface protocol, or the like. Rather, it is the currently-used term to represent solid state (typically FLASH) devices that are either pluggable or embedded in a computer-related system.

Additional storage may be provided by a memory system 100, that is connected to the host computer 5 by any a variety of transport mechanisms 50, such as a PCIe fabric, LAN, WAN, the Internet, or the like. Particular protocols such as iSCSI, FCoE, TCI/IP, or the like, may be used to transport data and manage the storage and retrieval of data. These may be characterized, for example as a Storage Area Network (SAN), Network Attached Storage (NAS), or the like. However, the specific mechanism for data and command transport, and the specific protocol for these functions are not intended to be a limitation on the system and method described herein. So as to emphasize this point, the transport between the host computer 5 and the memory system 100 is shown as a generic cloud 50.

The commands and functions described herein are often given in generic format, and a person of skill in the art would be able to adapt the generic description so as to use or to modify existing protocols or to devise new protocols so as to effect the method and system described herein. For example, there are several types of read commands, write commands, TRIM commands, and such commands need to be give names for descriptive purposes, and may be generically described, such as a first type, a second type or the like so as to distinguish therebetween.

The memory system 100 may be comprised of one or more memory modules 150, and each memory module may be comprised of a plurality of memory circuits 200. The memory modules 150 may have a memory controller or processor 160 and volatile random access memory 170. Other details of the memory module such as the interface to the transport mechanism and between the internal components would be appreciated by a person of skill in the art. The memory system may also have a memory controller or processor 140 that distributes commands to the memory modules. Functions such as logical-to-physical memory location association, garbage collection, wear leveling and other related data and signal processing functions may be performed, for example, either by the memory controller 140 or the processor 160, depending on specific system design requirements.

Where the memory circuits 200 are, for example, FLASH memory, the characteristics of such memory are that, after once been written to, a block of memory must be erased prior to again writing to a page of the block of memory. This characteristic gives rise to the usual flash translation layer (FTL) or similar schema for managing the reallocation of pages and blocks, including clearing entire blocks of any remaining valid data so that they may be erased, and the selection of erased blocks from a pool of erased (or free) blocks to be written to so as to even out the wear on the blocks of the memory, to avoid premature wear out. Other housekeeping functions such as periodic refreshing of data, either in place or by relocation, may also be performed.

Often, the memory modules are intended to emulate a hard disk drive (HDD) having rotating media, and conforming to an industry standard such as SCSI, in whatever version is currently being used (acronym and reference). So, the commands such as READ and WRITE may be issued in a standard format or in a proprietary format, and may include the provision of LUNs; however, the addressing of the data by the host is performed in a logical address space. A file system, a de-duplication function, and the like, may operate in the logical address space of relevance to the host or user. A command is sent from the computer 1 to the memory 100 over the transport mechanism and mapped by the FTL so as to locate the physical memory location in which the user data is stored. The user data may be retrieved and returned to the requesting application in accordance with the user LUN/LBA.

On both the user side and the memory side the address space may be subject to further indirection in addressing, so that a user may view the memory system as being comprised of logical unit numbers (LUN), each LUN having a separate address space and the LUN may be assigned to a user or to a user application. The LUN/LBA may then be resolved into a LBA of the memory system, and subsequently to a PBA. The PBA may either directly or indirectly point to the physical location where the data has been stored. Hence, there may be indirection on the user side in logical space and indirection on the memory side in physical space. Moreover, addressing may be, for example, a physical or logical address specifying a page of data of a particular size, a base address of a page, a base address and an extent of pages, a base address and a bit map of pages to be similarly processed, or the like.

The term LUN may represent any logical memory space that may be apportioned to a user so as to have known properties, such as extent, RAID type, page size, file format characteristics, or the like, and having corresponding storage locations in the physical memory. This may permit the co-existence of a plurality of users with each user having storage characteristics particularized to user application. For example, the storage characteristics may be selected to facilitate the storage of log-structured files, bulk data such as video, table data, or the like. The extent of each LUN may differ, as the storage requirements of each user or user application may be different.

A plurality of user applications which may be, for example, virtualized, may contemporaneously access the memory systems while maintaining the properties selected for each of the applications or users, analogous to threads.

One may consider the following discussion to focus on one LUN of the plurality of LUNs that may be established. The characteristics of the memory system as configured for each LUN of the plurality of LUNs mapping to the memory system may be different, as constrained by the physical resources of the memory. Within the memory system, each of the LUNs may resolve to a subset of the overall hardware to effect the properties as allocated to the each LUN. That is, corresponding to a logical LUN, a mapping of blocks of memory may be performed so that the logical LUN may have exclusive access to a group of physical blocks of memory and the management of the assigned physical blocks of memory is in accordance with the associated logical LUN characteristics and requirements.

Garbage collection parameters may be particular to a LUN. For example there may be use cases where the data is most efficiently written to the FLASH in logical sequential order, and by allocating memory resources on a LUN basis, the garbage collection criteria, such as the percentage of dead blocks that may be needed to trigger a garbage collection operation may differ for each LUN.

Wear leveling may be managed on a LUN basis, but may also be managed on a global basis for the memory system, as an objective of the wear-leveling process is to even out the usage of a block of a memory circuit over the expected operating lifetime of the memory circuits. As the frequency of writing data to the memory and erasing blocks of data varies with the type of data and the user needs, the rate of wear of blocks would depend on the specific LUN that is being serviced.

In an aspect, erased blocks may be placed in a shared pool, selected by the memory controller in accordance with a policy, when a free (erased) block may be needed by a particular LUN. The term "LUN", when used to describe memory side operations may thus be understood to represent a particular subset of the memory system, which may be associated with individual blocks, RAID groups formed from groups of blocks, a file system, or the like, that is managed for the exclusive use of the user or user application that has been assigned the LUN. So, even when the user has been virtualized by a process disposed between the user and the memory device and the time sequence of write operations received by the memory controller or processor 140 may become a somewhat random mixture of write operations initiated by a plurality of virtualized users, the write operations to the memory blocks of the non-volatile memory blocks currently allocated to a LUN may be processed in a sequential order with respect to the memory blocks of each of the LUNs individually. This contributes to the maintenance of a plurality of memory system characteristics that are each particular to a using application.

With respect to wear leveling, for example, a LUN may be characterized by a process for triggering garbage collection where a specific percentage of the storage locations of a block are obsolete, or a specific percentage are obsolete or free, or the like. Moreover, this percentage may be considered in conjunction with maintaining a minimum size for the erased block pool.

In another aspect, the criteria may be that all of the storage locations of a block should be obsolete before the block is selected for garbage collection. As described herein, the user may obtain knowledge of the location of the data in the physical storage space through the write operations and can specifically relocate data of a block so as to, for example, manage a log file, and then obsolete the whole block so that it is made available for garbage collection.

As the management of storage in FLASH-type memory systems becomes more sophisticated, and the sizes of memory that are used increases, the diversity of applications may be each best matched to the user needs and memory system capabilities may also increase. In some situations, the FTL and L2P tables in the memory system may manage the local operations relating to mapping the data and garbage collection, while in other cases, the data management associated with garbage collection may be managed using the write operations described herein, with only the lower level wear leveling and block erase and refresh functions, for example, being performed autonomously by the memory system 100.

When data is initially written to the memory system 100, the data may be written into sequential physical addresses of a block of FLASH memory corresponding to host logical addresses. After some time a memory location, previously written, may be modified by the host application by writing changed data to the corresponding logical address. However, as the FLASH memory location cannot be written to unless previously erased, the new data is written to an available (free) memory location meeting other criteria, one of which is that the physical memory locations of a block of FLASH memory need to be written to in monotonically increasing page order. (Pages may be of varying sizes, amalgamated as "super" pages, or the like) Writing data in monotonically increasing page order manner may be required by the memory device manufacturers so as to reduce the effect of "write disturb" on the integrity of stored data. Other additional criteria may be imposed to minimize wear. In any event, the changed data is not rewritten in the same place as the data to be changed. (An exception to this rule is if the entire block of pages is re-written when a single page is to be changed.)

So, when a write command is received by the memory system, the controller executes the FTL process, for example, and selects the next physical address to which data is to be written, maps this address to a L2P table of the FTL and stores the data in the physical address. Generally data is grouped into sectors (512 bytes) or pages (2 Kbytes or larger) for compatibility with existing logical space management protocols. Other sizes for the sectors, pages and blocks may be used depending on the storage capacity and manufacture of the chips, and there are systems that write in multiple page increments ('super pages") and the like. The process of allocating the physical address for storage of the data may involve scheduling or performing an erase operation, relocation of data using garbage collection, and selection of the block to be written to, based on wear leveling criteria. User write operations modify the L2P table, and user read operations using logical addressing access the L2P table in the memory system 100.

In an aspect, a computing system comprising a computer system 1 and a memory system 100 may be organized such that the computer system 1 operates substantially in logical address space and the memory system operates substantially in physical memory space. Each user or using application may manage a corresponding allocated LUN using a different schema, or protocol.

Figure 2:
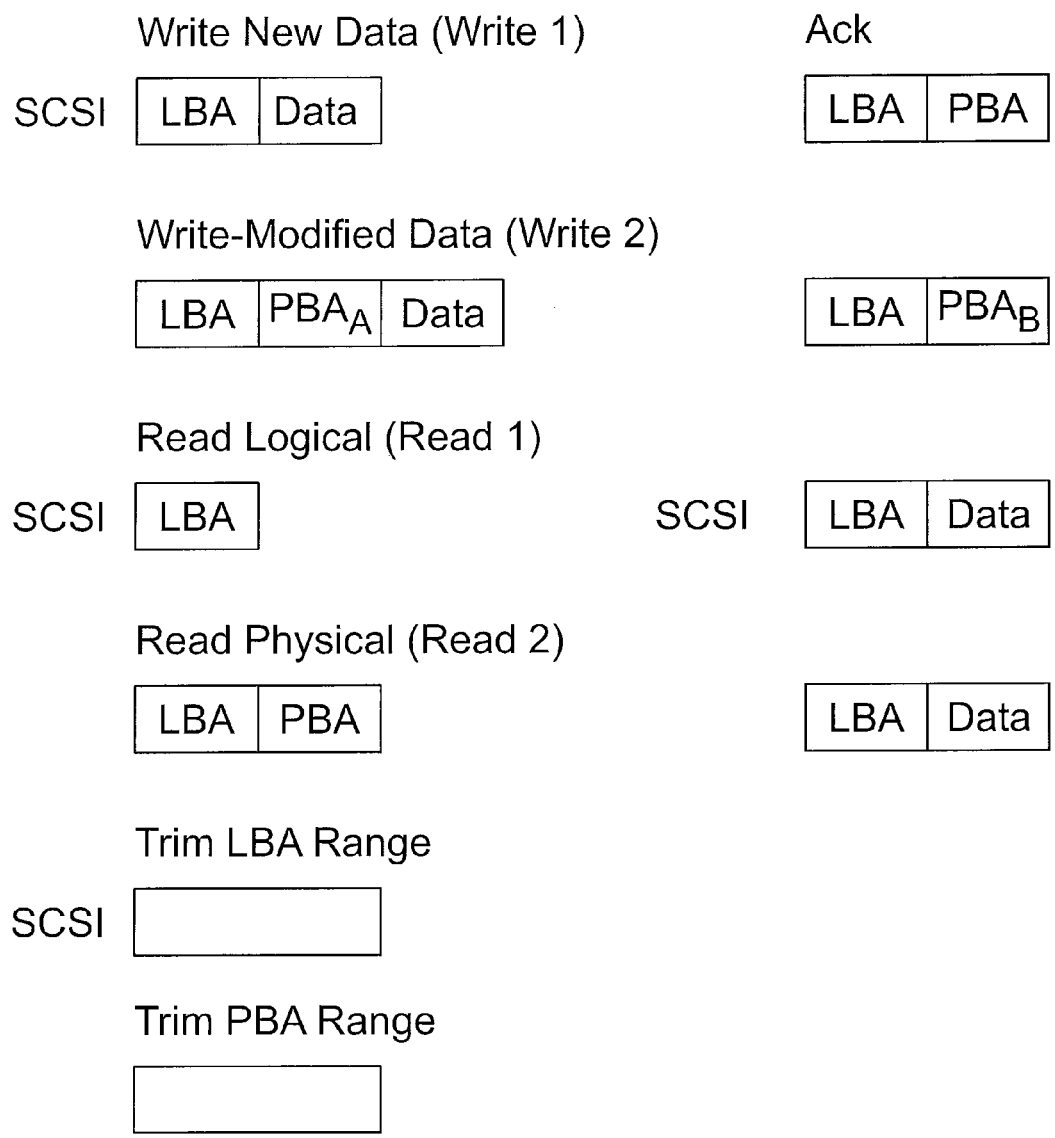
FIG. 2 shows examples of commands from a user and responses from the memory system where conventional commands and responses have been repurposed, or new commands and responses used to effect the operations.

Examples of generic commands which may be used to effect such operation are shown in FIG. 2. Two types of write commands are WRITE (new data; hereinafter WRITE1) and WRITE (modified data; hereinafter WRITE2).

WRITE1 operations may represent logical addresses that have not previously been written to or have been freed (for example by a "TRIM" operation) by the user. Herein a L2P table for the LBAs allocated to the requesting entity is maintained in the computer 5 rather than in the memory system 100. The range of LBAs allocated to a requesting entity may be defined as a LUN, a container, or by some other construct so as to permit allocation of resources to one or more users executing applications on a computer 5 or computers.

In an example, prior to dispatching the write command from the computer 5 to the memory system 100, an application of the computer 5 may be checked to determine whether there is a corresponding entry for a PBA of the memory system 100. There should be none if the LBA has not previously been written to or freed, for example by a TRIM command.

When a WRITE1 command is received by the memory system 100, the memory system 100 may assign a PBA to the command in accordance with a policy, and the data is written to the assigned PBA. When the data has been committed to assigned PBA in the non-volatile memory 200, an acknowledgement of the write operation is generated and returned to the requesting entity, which may be the computer 5. The acknowledgement includes both the LUN/LBA or other similar reference indicator, provided initially by the requestor application in computer 5 and the physical address at which the data is stored in memory system 100. The associated L2P table located in the host computer 5 or other location which may be outside the memory system 100 may be updated. Other methods of managing the storage at the user level such as a file system may be used. A bit map in the memory system 100, corresponding to the PBA location of the new stored data is set to a valid state. The acknowledgement LBA, PBA tuple may be stored in the memory system 100 for recovery purposes. This may be in the form of a log.

A person of skill in the art would recognize that some of the metadata may be stored in several places or forms and may be more than sufficient for the explicit system requirements. However, consideration in design should be given to employing some redundant metadata and metadata verification during operations as precaution against hardware failures or other inadvertent corruption of the metadata tables. Additionally, the metadata may be located at a place in the system where it may be most efficiently used by different processes.

WRITE2 commands may be used where the data in a logical address allocated to a user is to be modified. That is data corresponding to an LBA has previously been stored and has not specifically been invalidated (for example, by a TRIM operation or by a previous WRITE2 command). The LBA parameter of the WRITE2 command may be used to look up the associated physical address in the host 5, and the PBA associated with the data are included in the write request. Since the WRITE2 command includes the value of the PBA at which the data to be modified is currently stored, this data in the PBA is now being rendered obsolete by the new or modified data written in response to the write command. This follows from the inability of a page in a FLASH memory to be re-written without first having the associated block erased. The modified data, which is the payload of the WRITE2 command, may be written to a newly allocated PBA that was allocated in a same manner as for WRITE1 commands. When the data has been committed to the non-volatile memory 200 a bit map representing the status of the PBAs of the block may be altered to reflect the obsolete status of the PBA in which the data had previously been stored and the bit map of the page of the block corresponding to the PBA in which the modified data has been stored is set to a valid state. The acknowledgement message comprises a received LBA if such was included as a parameter of the WRITE2 command and the new PBA as allocated by the memory system 100. This tuple may also be stored in the memory module 150 for memory system purposes. At the computer 5, the application may now be updated to store the PBA at which the modified data has now been stored.

In another aspect, a form of WRITE2 command may not include data. Rather, a range of physical addresses, for example having the extent of a block, may be used to transfer the data from one physical block to another. Data within the physical address range that is obsolete may not be transferred. Thus a TRIM operation may be performed on a physical block and the new physical location of valid data reported to the using application. The location and referencing data may be mirrored in part by tables in the physical memory, or stored as metadata with the data.

Broadly, such commands as WRITE, READ, TRIM and the like, may be considered as an Application Programming Interface (API) or Application Binary Interface (ABI) having defined responses, and which may be parameterized so as to cause a variety of methods to be performed in response to user-supplied arguments for the parameters. Sometimes these APIs or ABIs are codified by industry standards, broadly as in POSIX or narrowly as in SCSI or the like, while other examples may be governed by a company published guide. The form of the API may be a function call, command, message, or the like. As such, the specific formats set forth herein are merely examples and should not be understood as limiting the particular embodiment. In an aspect, the allocation policy for PBAs for the storage of new or modified data may be that the data is stored in the next highest page PBA of the block to which data is currently being written and a write pointer advanced to the next page of the block. Policies for selecting a next block from a pool of blocks when a current block has been filled, for maintaining a plurality of partially filled blocks, or for striping the data across a plurality of memory circuits 200 for increasing parallelism or redundancy purposes are described later.

The effect of the WRITE1 and WRITE2 commands is to maintain the knowledge of the physical location of the data in the memory 100 in the computer 5, or other data management method. If the location associations are also stored in the memory module 100, a backup is thus provided. Since this backup may not be needed during other than recovery operations, it may be maintained in the memory system 100 as a log file to be processed as needed. Maintaining the backup in non-volatile memory may obviates the need for a L2P look-up table in the volatile memory of the memory module 100. In an aspect, where the host computer 5 has an associated non-volatile cache memory, the backup for the L2P table may be stored in the cache. Such cache memories may be used, for example, for storing frequently accessed data or for data de-duplication, as is known in the art.

The WRITE2 command may have the PBA of the data that is being modified as a parameter. This may be expressed as a base address and an extent. For clarity in this discussion, the data being modified (made obsolete) is considered to have been stored at PBA1, and the data that is the modified data (new data) is stored at PBA2. The new data and the old data may have the same or a different value. Prior to completing the WRITE2 operation, the metadata stored at PBA1 may be read and an aspect of the metadata may be compared with an equivalent metadata value that was included in the write command. The two metadata values match if the appropriate data (PBA1) is being modified so as to be stored at PBA2. Using such a validity check may also increase the security of a shared memory system as both an aspect of the metadata and the PBA of the data being modified by the WRITE2 command would be specified in the write command. The metadata being used for this purpose may be, for example, the LBA of the data in the host 5, or a hash computed on the LBA, or on the data itself. Where the metadata is a hash of the data itself, the hash may not be stored as metadata with the data in the memory system 100 but, alternatively, can be computed based on the stored data at the PBA being to modified. The sequence of writing and reading operations can be overlapped as a mismatch is unlikely in a properly operating system. If a mismatch occurs and the modified data has already been written to a new PBA, the data can be marked as obsolete and an error message generated. However, the possibility that an attack on the memory may be made by sending a stream of mismatched (incorrect metadata or PBA) commands should be considered and a check of the metadata may be desirable prior to committing the modified data to memory.

Two types of read commands may be READ (logical address), hereinafter READ1, and READ (physical address), hereinafter READ2. READ1 may be used, for example, when the SSD is configured as is currently conventional where a L2P table in the SSD or memory system 100 is maintained by a FTL and the translation of logical-to-physical address is performed at the SSD or memory system 100. Where the READ1 command is interpreted by a device driver or operating system of the host 5 in accordance with a L2P table maintained in the host 5, the READ1 command may be altered to a READ2 command using the knowledge of the association between the logical and the physical address in the host computer L2P table.

Where the SSD is configured conventionally, the READ1 command would be interpreted, for example, at the SSD using the L2P table maintained in the SSD and the data returned to the user at the host computer 5. However, this command may be considered to be when the SSD is configured to accept READ2 commands.

The READ2 and WRITE2 commands may also be used in a SSD which maintains a local L2P data structure. In such an SSD, which would be capable, for example, of supporting the standard READ1 and WRITE1 commands, the use of the READ2 and WRITE2 commands may reduce the latency in the execution of the commands. Typically, to return the data for a READ1, a typical FTL may have to use the L2P data structure to map the requested LBA to the PBA holding the data. This use of the L2P data structure in the SSD may involve one or more accesses to the flash memory to look up the PBA, which takes time, consumes bus bandwidth, accesses dies which may be needed for other contemporaneous operations, uses ECC decoder resources and other resources and control logic all of which reduce computational time line and bus bandwidth resources that would otherwise be available for the other operations. By using the PBA provided by the READ2 command, the flash memory may be read to return the user data without traversing a L2P table at the SSD. Where the metadata stored at the PBA (for example, the LBA as metadata) indicates that the desired LBA is no longer located at the PBA, a FTL L2P lookup performed at the SSD. In a situation where no additional metadata is provided to verify that the PBA contains the most recent version of the LBA data, the FTL lookup in the local L2P data structure may be performed in parallel with reading the data from the PBA, allowing the return of the requested data as soon as the FTL lookup verifies that the PBA holds the current copy of the LBA data.

Since most overhead-type data relocations (e.g. garbage collection, wear leveling) are effectively driven by the frequency of user write operations to the SSD, the probability of encountering relocated data in a read operation may be roughly proportional to the rate of writing data.

In a circumstance where the process of execution of the READ2 command, as described above, has determined that the requested LBA was not at the PBA provided in the READ2 request, then the response message corresponding to the command then sent to the requestor may include the PBA at which the LBA is now located, in the same manner as the WRITE1/2 commands. This may result in an update to the L2P table maintained in the user computer 5. Or, a status message may be returned indicating that the LBA data is no longer at that PBA indicated by the request.

Additionally such commands as VERIFY or LOCATE, which take as arguments an LBA/PBA pair, or just an LBA, and return the current PBA of the indicated LBA may be used. Such commands may be used to verify the location of LBAs for integrity purposes, or in response to a status return indicating the PBA given in a READ2 was not valid. Alternatively, the responses provided where the PBA was not valid may be the same as for the type of TRIM command where a fixed pattern of data is returned. In this manner an invalid PBA may be protected from being read.

The VERIFY and LOCATE commands, for example, may take address ranges as arguments rather than single addresses. The return result may also be a range where the requested addresses are stored sequentially, a list of addresses, a range with an exception list, which may be a bit map, or an indication that individual address requests are needed.

For the WRITE2 command the local L2P map at the user computer 5 would be updated; however, the same latency reduction as the READ2 command may be achieved where the WRITE2 command is updating data smaller than the size of the data stored as a basic storage size (e.g., a "page"). For example if the SSD maintained the local L2P table as stored data in 4 KB pages, a WRITE2 command for writing only 512 bytes of data to an address inside a given 4 KB LBA may first have to read the 4 KB of data currently stored for that LBA, replace the specified 512 byte range with the newly supplied data and then write the whole 4 KB back to the flash. By providing the PBA as part of the WRITE2 command the read-modify of the 4K may be performed in parallel with the L2P update.

The READ2 command may have the LBA or some representation thereof, such as a hash of the LBA or the stored data that has previously been computed as metadata. The SSD operates on the PBA so as to retrieve the data from the physical location pointed to by the PBA, makes any desired check of data validity, which may include checking the stored metadata for the LBA or hash, or computing the hash of the data, or the like, and returns the data to the host 5 and the user. The returned data may be identified by the LBA of the READ2 command.

The READ2 command may have the LBA as well as some hash value, sequence number, nonce or other metadata some of which may be used to verify a valid version of the data is being read. In the event that the portion of the LBA or other metadata of the data located at the PBA given in the command does not match the corresponding expected metadata given in the command, this may indicate that an overhead operation performed by the SSD, for example, had relocated the requested data. The SSD may locate relocated data of an LBA using the local L2P table. Alternatively, where the requested LBA is not located at the PBA given in the READ2 command, the SSD may return an error or a TRIM-type response the requested data cannot be located. Where the flash device does not have a local L2P table, the current PBA along with the requested data may be returned so that the used computer 5 can update the L2P information. Updating of the host computer L2P table to account for overhead operations of the SSD may be performed as a background operation, as subsequently described.

After a period of time, the percentage of blocks of memory of the memory system or of an individual SSD of a memory system, that has been allocated for user data storage may become filled, or almost so. Memory systems, such as those using FLASH memory are typically overprovisioned. That is, there is more physical memory available than is made available to either the users, or for the needs of overhead operations. Even disk systems have a small amount of overprovisioning to account for occasional sector failures. (By convention, the capacity of hard disk drives (HDD) and SSD is stated in decimal format, while the actual capacity is a binary number, yielding about 7 percent overprovisioning.) With FLASH, a larger amount of overprovisioning is typically provided. This may range from an additional 10 percent or less to 50 percent or more, depending on the performance attributes and price point of the SSD.

At least by the time that the user available space is filled, an operation termed "garbage collection" is performed so that space for modified data is available. (From the viewpoint of the memory, any data written to a PBA is new data in the sense that the page to which the data is written is a never-before-used page or an erased page. The characterization of the data as new or modified should be generally viewed as a user-related construct, although some aspects of the data status may be represented in the metadata stored with the data, or in the L2P table.)

As discussed above, when data is modified, as the modified data cannot be written into the PBA that holds the data being modified, additional storage space is needed. The garbage connection process may generally be thought of as identifying the pages of a block that are still valid; moving the valid pages to a block having free pages; and, erasing the block being garbage collected. The locations of the relocated pages are usually accounted for by modifying the L2P table maintained in the SSD. In an aspect the user computer 5 may also be updated.

Selection of a block of a plurality of blocks having a particular percentage of data that is obsolete is chosen for garbage collection may be determined by a process known as "wear leveling." The percentage may be established, for example, as a threshold value, a range of values, or by a combination of values and number of times the block has been erased. The objective of this process is to even out the number of times a physical block has been erased over the lifetime of the SSD device. Since FLASH memories are characterized by a wear-out phenomenon where the number of block erase cycles of an individual block which may be sustained before the error rate of stored data or data retention time in a block becomes unacceptable is limited to from about 1000 to about 1,000,000, depending on the type of FLASH memory, the repetitive erasure of a single block would lead to premature wear out of the device.

The activities of garbage collection, wear leveling and updating the L2P table of the SSD are generally thought of as embodied in the flash translation layer (FTL) of the SSD. However, when WRITE2 and READ2 commands are being employed, the active L2P table may be located in the host computer 5, and information would need to be exchanged between the SSD and the host computer 5 in order to keep track of the relocation of the PBA at which a particular LBA was stored as a result of garbage collection and wear leveling as these processes may occur autonomously of the needs of the host computer 5 and the user.

The amount of information exchanged to track the relocation may be mitigated by, for example, identifying the LBAs in a given block, or a give range of physical addresses, that have been moved to a new block or new range of addresses. Situations where not all addresses in a block or range are moved can be handled with bitmaps, exception lists, or other annotations on a basic indicator. This may permit the L2P, file management system, or the like, at the user computer 5 to receive a smaller sized notification with which the modifications to the corresponding L2P at the SSD may be tracked, and to perform the modifications at the user computer as a background operation rather than having to process the changes immediately. If there are unprocessed notifications when a command to perform an operation on a given LBA is to be sent to the SSD, checking the PBA against the block or address range would determine if the PBA of the requested has changed and the new correct PBA then sent using the L2P at the SSD.

In an aspect, the need to inform the host computer 5 of the relocation of the data individually may be avoided or minimized by using a form of "in-place" garbage collection. In a simple form, a block of the memory may be selected for garbage collection. The valid data pages are read from the memory temporarily into volatile memory 170 where the obsolete (have been modified, deleted or otherwise moved) pages are identified and the PBAs of the obsolete pages are stored in a temporary allocation table. The block may be erased such that all of the addresses in the block are now free, and the data temporarily stored in the volatile memory 170 is rewritten to the block. During the process, where the PBAs are to be written in monotonically ascending order in the block, the temporary allocation table associates a free PBA (which was previously occupied by an obsolete data value) from the temporary allocation table to a page of data in a queue of garbage collected data in the volatile memory to be written to the nonvolatile memory. Thus, garbage collected data awaiting storage is stored in the PBAs that previously held obsolete data. The L2P table is updated to record the changed data in the block. The number of records in the L2P table that are undated is reduced from a situation where all of the data to be written is assigned new PBAs. As only a portion of the selected block may be comprised of obsolete data, only the L2P table records associated with the replacement of the obsolete data with garbage collected data is changed.

When repeatedly writing data to a same block, and where the data relative locations do not change, excessive wear may occur with individual bits being repeatedly written. The entire data of a block may periodically be written in an inverted-bit format based, for example, on the number of prior erasures of the block.

When the writing of data to a free block has been completed, the page locations previously occupied by obsolete data are now written with modified data and any new data which may have been in a cache of data awaiting storage. The cache may be in the volatile memory. The PBA of each of the modified data pages is returned to the host computer 5 so as to update data management application. That is, a service message may be sent, for example, on a block basis to update the user computer. Desirably all of the memory locations previously occupied by obsolete data will be filled with modified data or new data during this operation. However, there may be circumstances where the commitment of data to the nonvolatile memory 200 mat need to be made immediately (such as during a power loss) and pages for which no modified data is available are written with a flag such that the all of the data in the volatile memory 170 can be stored.

The exists a situation where data stored in a PBA has been relocated due to garbage collection, and the new location of the data is not as yet updated in the L2P table. Since the data has not been changed in value, the data at the known location and the data at the new but not as yet referenced location are the same providing that the garbage collected block is not erased until the L2P table has been updated. The metadata will be correct in both locations and the correct data will be returned from the known location. An intervening write operation would have caused a change in the metadata as an argument of the write operation and a mismatch would have occurred. This mismatch results in, for example, the use of the local SSD L2P table to identify the correct PBA.

"In-place" garbage collection alone may not satisfy the wear leveling aspects of the process as the block may store "active" data. This term is used to distinguish between data that is frequently modified as "active" and data that is infrequently modified as "static". Both active and static data are "valid" data, as would be understood by a person of skill in the art. A block having active data (at least if the activity is a write operation) will need to be garbage collected frequently and may therefore wear our earlier than a block having static data. The SSD may not determine which groups of LBAs or associated PBAs is active or static; the activity is governed by the host 5 and user needs.

One form of mitigation of wear if the blocks are rewritten in place is to write the compliment of the data to the block. Which of the two states of the data exist may be determined, for example, by the block erase count. At least this writes a substantially equal number of "0" and "1" bits to the pages over time.

Figures 3A, 3B:
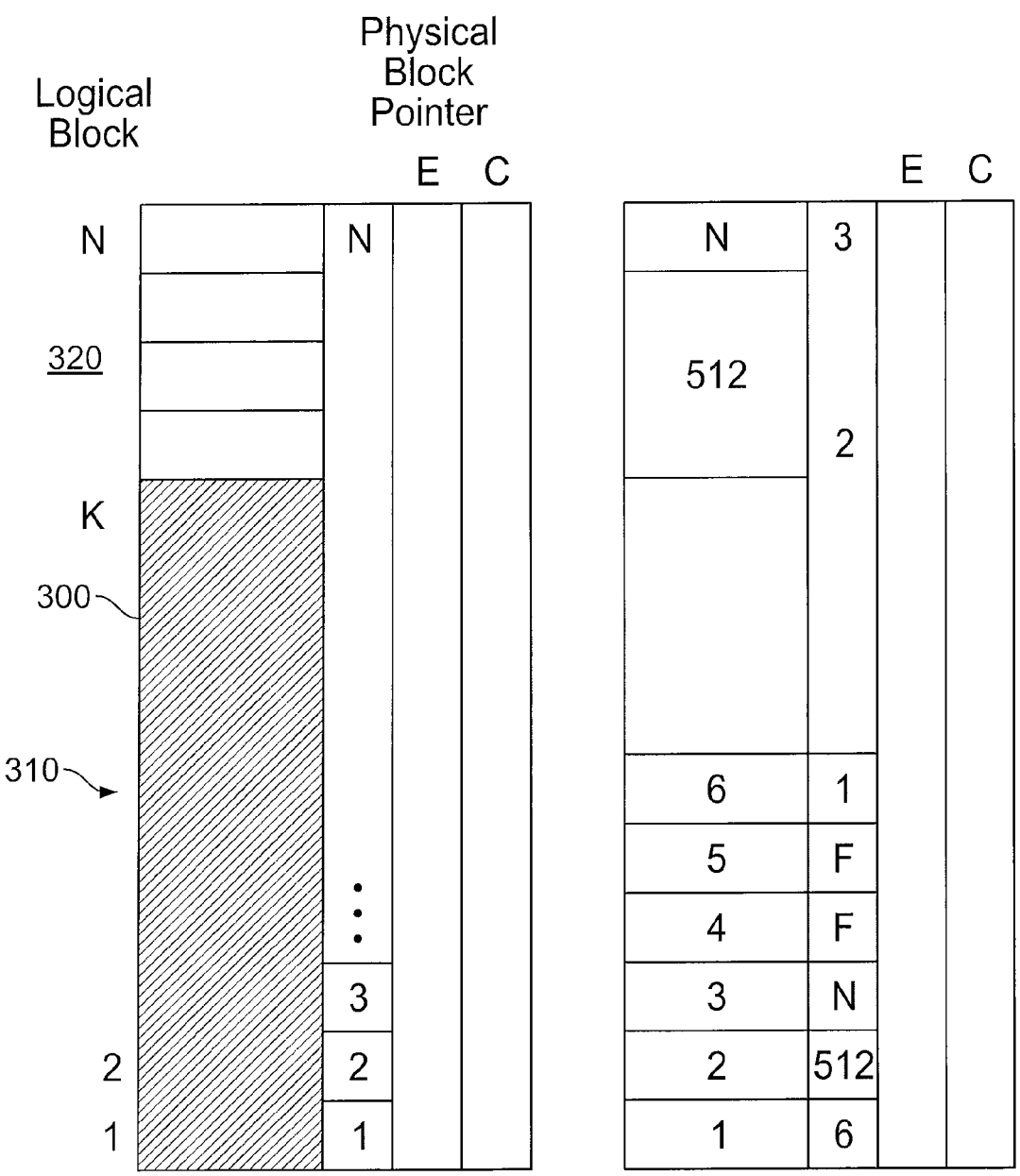
FIG. 3A shows and initial association of logical blocks of memory with physical blocks (where the blocks are each comprised of a plurality of storage locations) and 3B, an example of the state of the association table after operation of the memory for a period of time.

However, inevitably, such measures will still result in uneven wear on the blocks. So, data in a block being garbage collected needs to be relocated to another block after a predetermined number of "in-place" garbage collection operations. Yet, the need to notify the host computer 5 of this process may be obviated. FIG. 3 illustrates a data structure that supports relocation of memory blocks without updating the physical memory address (PBA) as experienced by the host computer. FIG. 3A is an example of the data structure at system initialization, where all of the blocks of a FLASH memory device are unwritten and where K blocks are made available to the user of a total of N memory blocks of a FLASH device. A single plane of a memory chip may be comprised of N memory blocks; each block may be comprised of 128 pages; and, each page may be comprised of 2 Kbytes. The numerical values are given so as to facilitate explanation of the operation, and other values may be used, depending on the device architecture. Further evolution of memory technology may result in different relative values and nothing herein should be interpreted as limiting the scope of the concepts disclosed herein.

Each block may have a block number (BN) and be paired with a physical block (PB). The PB may be characterized as having an erase count E and a space count C. The erase count E is the number of times that the PB has been erased, and the space count C is the number of pages that have been made obsolete subsequent to the last block erase operation. In this simple example, it has been assumed that each page of the block has been written and that a number C of pages have been modified and relocated to another physical address. Where the operation of the memory system is configured so as to leave some blocks only partially written, another parameter, which may represent the number of free pages remaining in a block may also be maintained.

When modified data is to be written to the FLASH memory, a physical location is selected in accordance with a policy. For example, a block of user allocable memory is selected, based on the garbage collection and wear leveling criteria. This block may be either garbage collected in place or relocated, depending on the state of wear of the block and that of the remainder of the system. Where the block being garbage collected is being relocated, a free block (one that has never been written to, or has been erased) is selected from a pool of such blocks and the PB value of the selected block may be associated with the BN of the block being garbage collected. The PB being selected may be in accordance with a policy, such as the PB with the lowest erase count E. The association between the two representations of the block represents an address offset between the BN and the PB in increments of 128 pages (256 Kbytes), which is an integral block. Whereas FIG. 3A shows that the associations between the BN and PB is a one-to-one relationship at initialization where BN=PB and the value of BN is a monotonically increasing integer, FIG. 3B shows that after some time the association between the two representations is given by the data structure, and that the temporal evolution of the one-to-one relationship is driven by the modifications of data made by the host computer 5 to satisfy user requirements and by the SSD to accomplish garbage collection and wear leveling, for example.

By indexing the physical block address (PBA) as understood by the host computer 5 using a data structure such as shown in FIG. 3, an efficient relocation of data may be performed without reporting the relocation to the host computer. This additional level of indirection efficiently relates the host PBA to the relocated physical block while maintaining the internal ordering of data in the relocated physical block.

FLASH memory devices are substantially non-volatile. That is, they retain data through power-off power-on cycles, where the power-off time may be long. Depending on the type of memory, the operating conditions and the state of wear, this "long" time may range from perhaps one day to several years. To avoid data loss, the data may be periodically read, error corrected if necessary, and either rewritten in place or relocated. This operation is another system maintenance (overhead) function and is often called data refreshing. Garbage collection may be performed as well so that the obsolete pages may be used to store newly modified or refreshed data.

Garbage collection in place operates by reading all of the valid data of a block into volatile memory, erasing the block, and rewriting the valid data, including newly modified data to the obsolete page addresses. The amount of non-volatile memory is at least equal to the size of a block. Where the garbage collection is performed with relocation, the valid data being read from the block being garbage collected may be merged with the modified data awaiting storage and immediately written to the selected free block. The size of the non-volatile memory buffer may be reduced to that needed to buffer a portion of the data being relocated.

In an aspect, a number of blocks meeting the criteria for garbage collection may be selected and placed in a queue for reallocation. For each of the selected blocks, the addresses of pages having obsolete data may be identified and placed in a queue for reassignment as the PBAs of newly modified data. So, there may be a data structure having such PBAs immediately available for assignment when a WRITE2 command has been received. Providing that the design of the hardware and operating software is such that the pending requests can be committed to non-volatile memory without loss in the event of a loss of power, disorderly shutdown or orderly shutdown, the WRITE2 command may be acknowledged with the corresponding PBA without delay.

The L2P data structure in the host computer 5 has been previously described. Such a data structure may be maintained in volatile memory for speed of response, but this implies that the data would need to be recoverable in the event of a shutdown, power loss, or the like. One way of doing this is to periodically checkpoint the host L2P data structure, either in part or entirely into a non-volatile storage medium, which may be the SSD itself, a non-volatile cache or the like. That is, the LBA range, metadata, and the like associated with a SSD may be stored in the SSD for restoral purposes. For simplicity, the checkpointed L2P table may be assigned to a predetermined set of BNs that is known to the host computer, and these BNs may be in the user data space or in a reserved logical space. That is, any of the physical blocks may be used for the checkpointed log. Typically the blocks would be fully written with data, as the checkpointed data is static. When the checkpoint wraps round and a block is to be erased, the election of the PB to next be used for this purpose may be in accordance with the garbage collection and wear leveling policies. A transaction log may also be maintained in the SSD so that the checkpointed log may be recovered quickly if needed. An orderly shutdown would result in the entire current host L2P table being stored in the SSD. The host L2P table may contain information that is not maintained in the SSD L2P, where the additional information is maintained by the user application. However, the SSD L2P table is a subset of the host L2P table.

Figure 4:
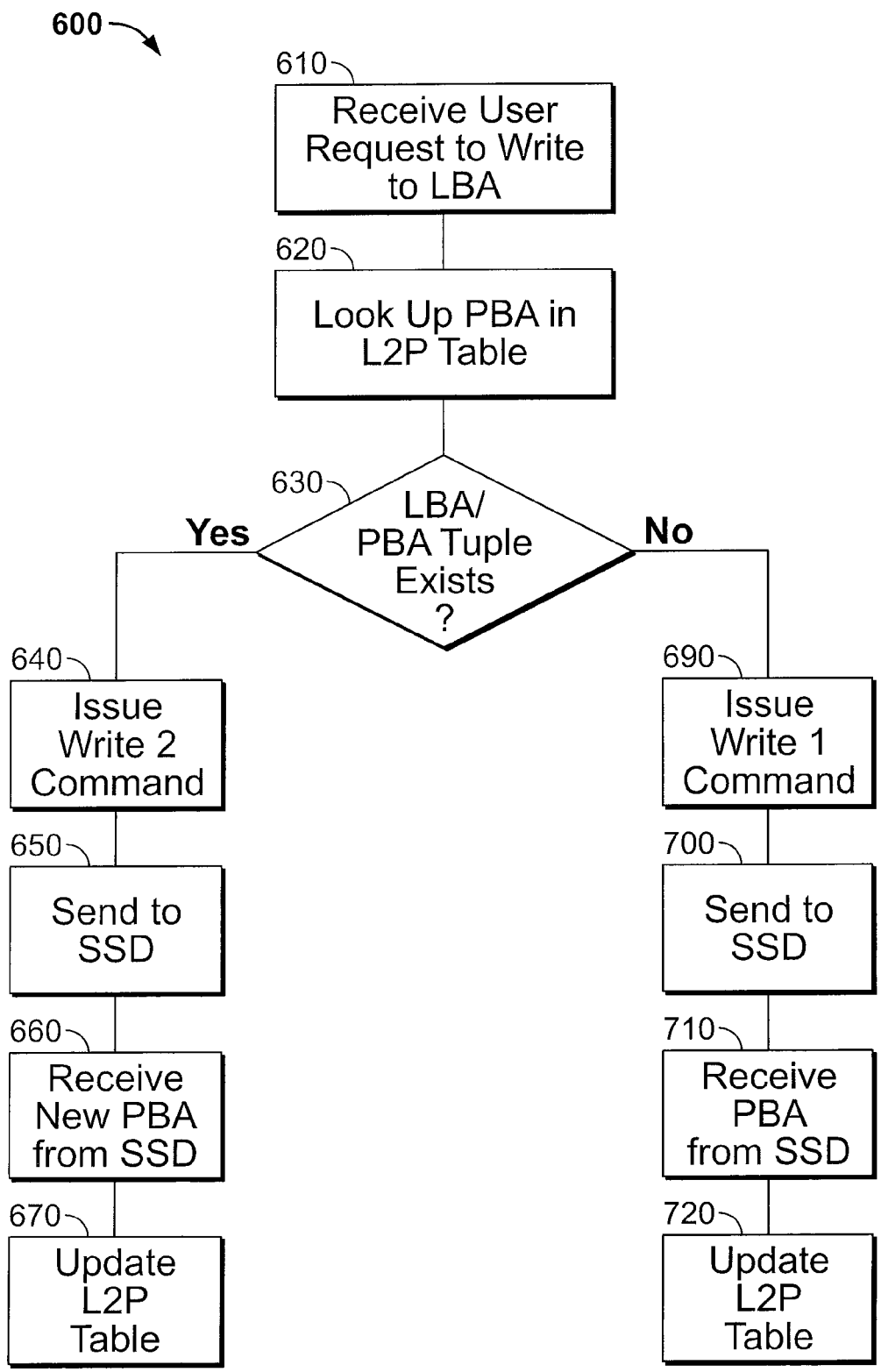
FIG. 4 is an example of a user process or device driver in the user computer where a decision to issue a type of write command depends on the information provided by the user regarding knowledge of the data location in the memory system.

In an aspect, a method of managing the memory may use a device driver installed in the host computer 5 to mediate between the user, which may be a file system or other using application and the memory as represented, for example, by one or more SSDs. The characterization of the process 600, shown in FIG. 4, as being a device driver is not intended to preclude applications where, for example, the functions are performed as part of a file system, virtualization system or the like. At a higher level in the system, the logical address of a page of stored data may be characterized, for example as a logical unit number (LUN) and a logical block address (LBA) within the LUN. Eventually, however, the logical address may be resolved into an address value within the range of LBA exported to the host computer 5 by the memory system 100 for use by the L2P table, or by the device driver 600 of the host computer 5.

When a user command 610 is received by a device driver 600, the command may be for writing to a LBA that may not have been used before (WRITE1), or to a LBA having an associated PBA for the purpose of writing modified data to the LBA (WRITE2). In another aspect, an LBA may have been written to at some time in the past and the data therein rendered obsolete, for example, by TRIM command. In effect, the LBA has been dissociated from a PBA and when the LBA is again allocated, the situation is equivalent to the LBA never having been written to before. So a WRITE1 command would be appropriate.

Thus, selection the appropriate write command may be accomplished by determining whether a look up 620 of a PBA corresponding to the LBA is successful 630. Where the lookup is unsuccessful (630-NO), data has not been previously stored to the LBA, and a WRITE1 command is composed 690 and sent 700 to the SSD over the transport subsystem 50. Where the lookup is successful (630-YES), data has been previously stored and is being modified by the write operation. This is a WRITE2 command, which is composed 640 using the PBA returned from the L2P table and any metadata that is to be used for validation of the address being modified. The data is sent 650 to the SSD over the transport subsystem 50.

Herein, the successful responses and actions related to such responses are described. Error cases are expected and need to be accommodated, although only a few are described in the examples herein.

Where a WRITE1 command is issued and the SSD stores the data payload successfully, the acknowledgment includes the newly assigned PBA. This acknowledgement is received 710 and used to populate the L2P table 720 in the host computer 5 with a reference to the LBA used for the write. Where a WRITE2 command is issued and the SSD has stored a modified data value payload, the response from the SSD 660 includes the new PBA, which is used to update the L2P table 720.

Figure 5:
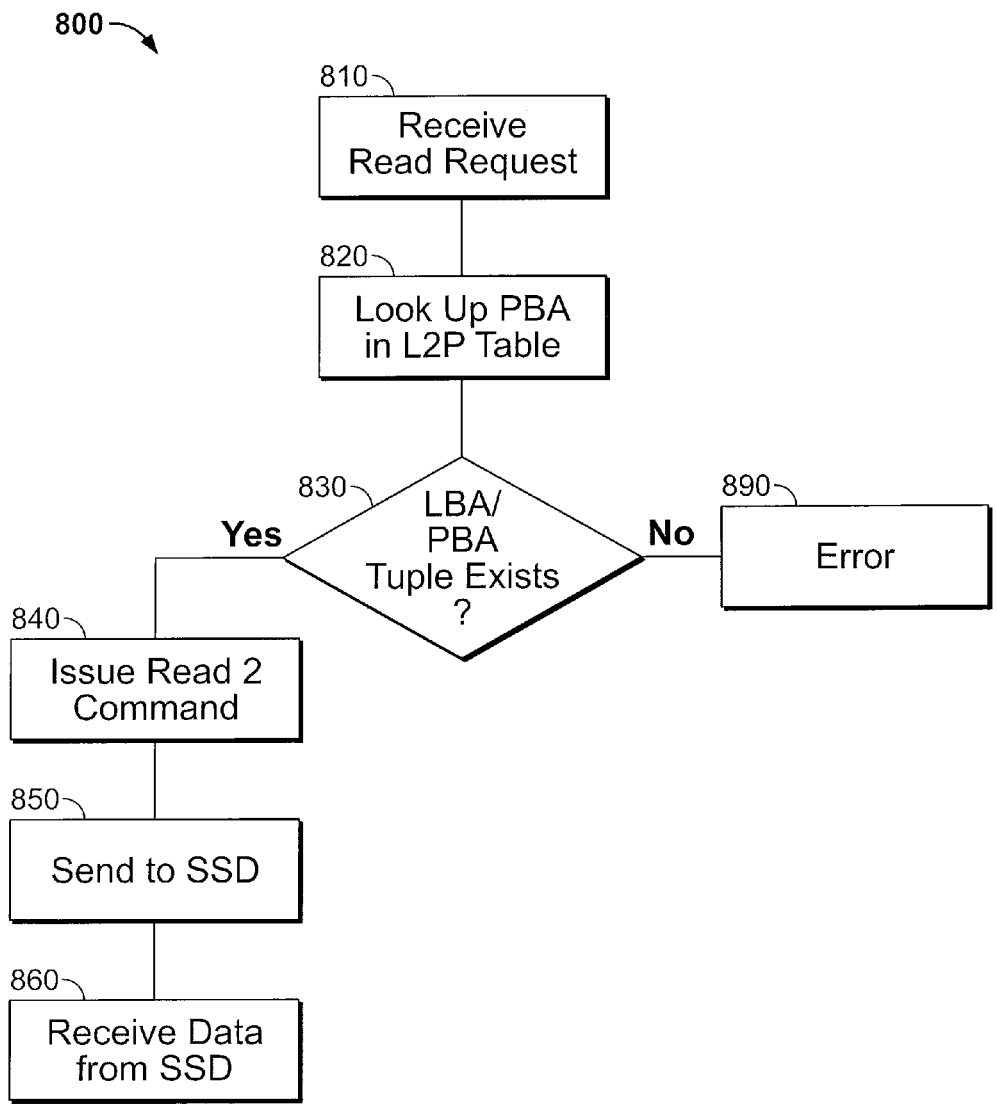
FIG. 5 is an example of a read command by the user computer where a known physical address is used to look up a logical address.

FIG. 5 shows a process for reading data from the SSD. The using application requests data 810 using a logical block address (LBA). This approach maintains the independence of the using application from the details of the SSD storage. The LBA is used to obtain the PBA at which the data is stored 820 from the L2P table in the host computer 5. If there is no corresponding PBA, then there is no existing stored data 830-NO and this may be an error condition 890.

Where a PBA is associated with the requested LBA, a READ2 message is composed 840 and sent to the memory system SSD 850. As the READ2 command includes the PBA at which the requested data is stored, the data may be directly addressed. If the block-relocation garbage collection is implemented, then the block lookup index is obtained from a data structure so as to complete the physical address resolution. When the data is returned 860 by the memory system, the command has been satisfied.

Figure 6:
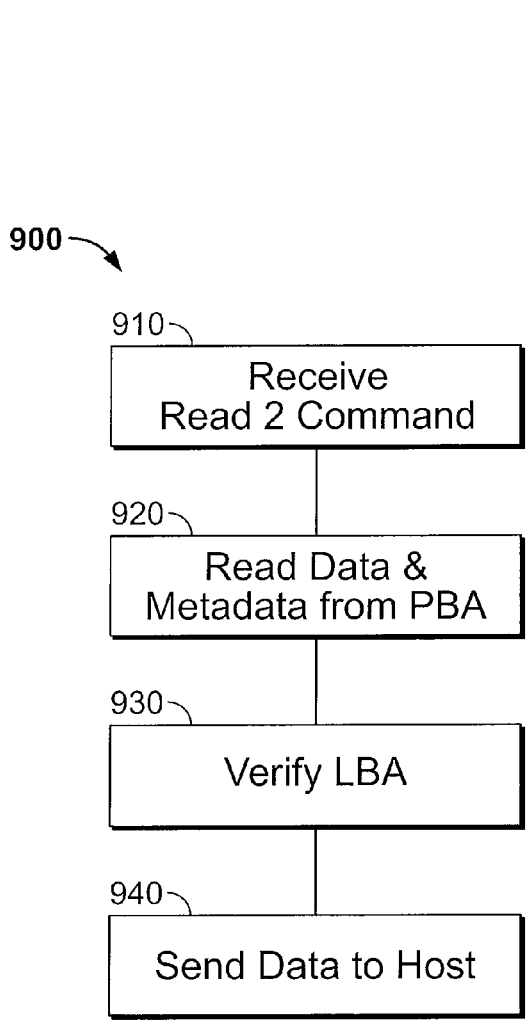
FIG. 6 is an example of the processing of a read command at the memory where the physical address has been supplied as an argument of the read command, including verification of the access using a supplied logical address.

As shown in FIG. 6, when the READ2 command is received 910 by the memory system 100, the process 900 executes a read of data from the PBA pointed to by the read command. Where garbage collection and wear leveling are accomplished by block level relocation, the PBA may be modified by a block offset value obtained from a data structure, as previously described. The data and metadata is read 920 and a check may be performed 930 on the metadata to ensure that the read command is for the correct data. The metadata may be the LBA of the data stored at the time of writing the data, a hash of the data or the LBA, an index, time value, or the like. Performing this check may be useful as a security measure as the requesting application needs to have had permission to access the L2P table in the host computer 5 to obtain the PBA. A spurious command would not have access to the requested LBA and would result in mismatched metadata. When the access command has been verified, the requested data is returned to the host 940.

Figure 7:
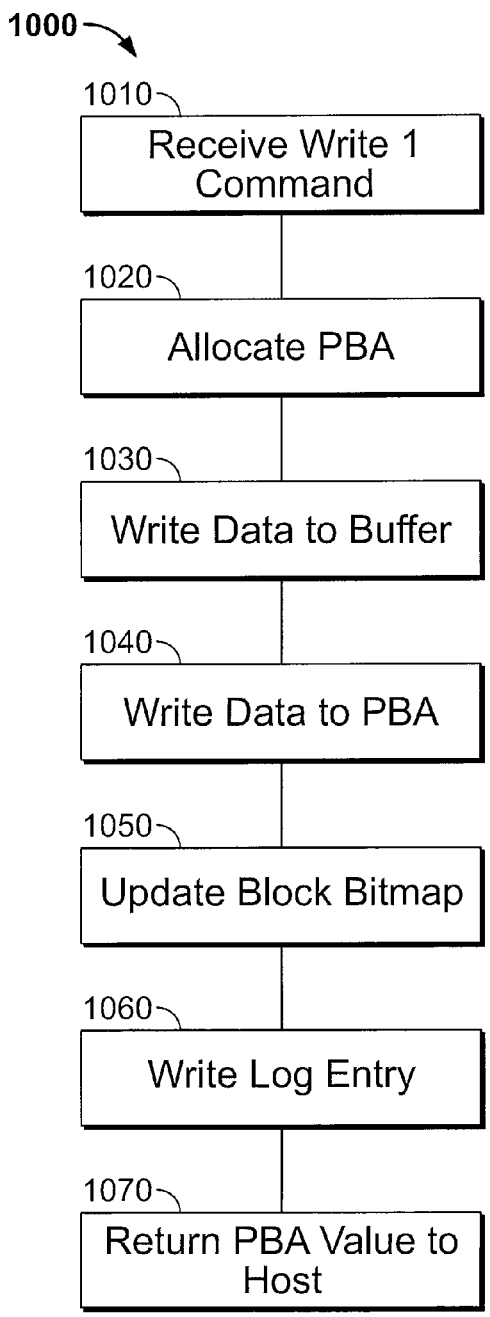
FIG. 7 is an example of writing data to the memory when the write command does not include a physical address as an argument.

As shown in FIG. 7, a WRITE1 command with an associated data payload is issued when a write is requested at the host computer 5 and there is no corresponding previously stored data. The process 1000 comprises receiving the command 1010 at the memory or SSD and de-queuing a free PBA from a table 1020. The allocated PBA points to the next available free page to which data can be written. Where the in-place garbage collection is used (with or without block level indirection), the data to be written is placed in a buffer 1030 so that it may be inserted in the stream of data being written to the block when the garbage collection operation is being performed, or to a next block with free pages. The data is written to the block when the appropriate PBA so as to preserve the monotonic aspect of writing to blocks, which may be by insertion in a the appropriate garbage collection buffer or in a buffer to be written to a new block or partially filled block, depending on the availability of the storage space at the time of writing the data. The bitmap representing the status of each page may have been reset to free when the block was erased to be placed in the free block queue and the bit associated with the PBA is now set to valid. When a block is written and a PBA is skipped (due to a lack of data availability) the bit is set to obsolete, as data cannot subsequently be written to the PBA. That is, in a situation such as a shutdown, a block of data may be effectively filled by setting the remaining bits of the block bit map to obsolete. This may facilitate rapid recovery.

To provide for recovery from a failure, a log entry is created 1060 to be stored in the memory system 100. This log entry may be used to update a backup L2P table in the memory system 100, or stored without further processing in either the memory or the host, with the updating of the L2P table performed in the host computer 5. The assigned PBA value 1070 is returned to the host, where the host L2P table is updated as previously described. The specific time when the response is provided to the host depends on the hardware design and depends on when the data and log entry are considered to have been securely committed to non-volatile memory.

Figure 8:
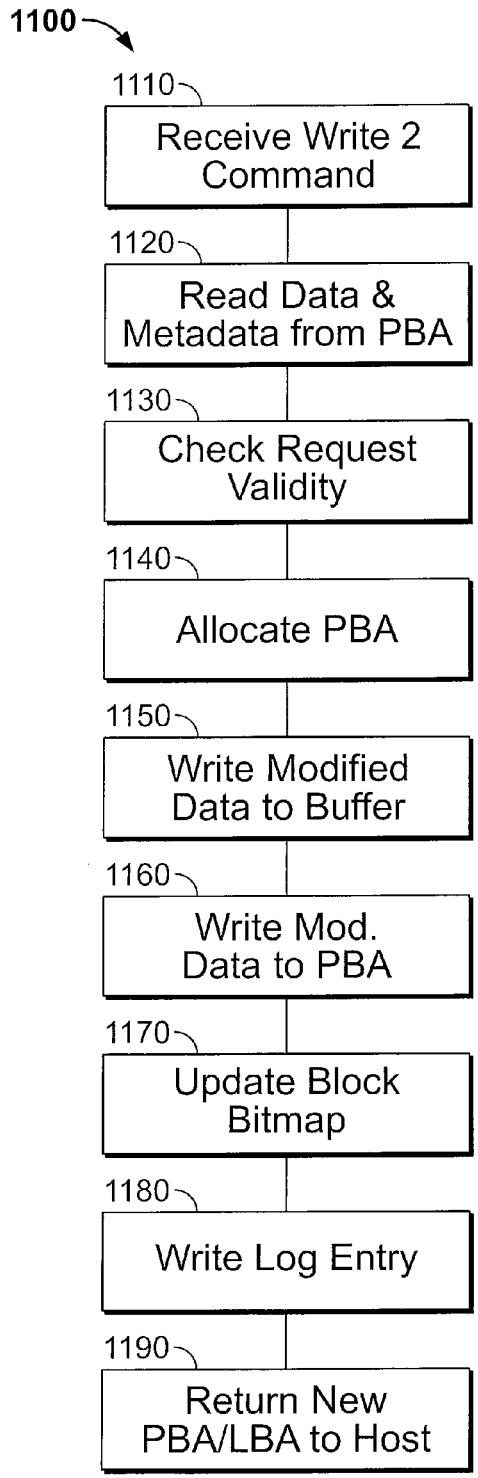
FIG. 8 is an example of writing data to the memory where the write command includes the physical address at which data to be modified has been stored, and the process of making the new physical address where the modified data is stored known to the user.

As shown in FIG. 8, a WRITE2 command with an associated data payload is issued when a write is requested at the host computer 5 and data has been previously stored to a LBA having a paired PBA. The command is received 1110 and data and metadata is read from the PBA. The validity of the command is checked in a manner similar to that of the READ2 command and the data is written to the memory in a manner similar to the WRITE1 command, so that the result is the assignment of a new PBA to the data as it is being stored. This is the PBA value stored in the log and returned to the host computer as a success indication for the command.

Figure 9:
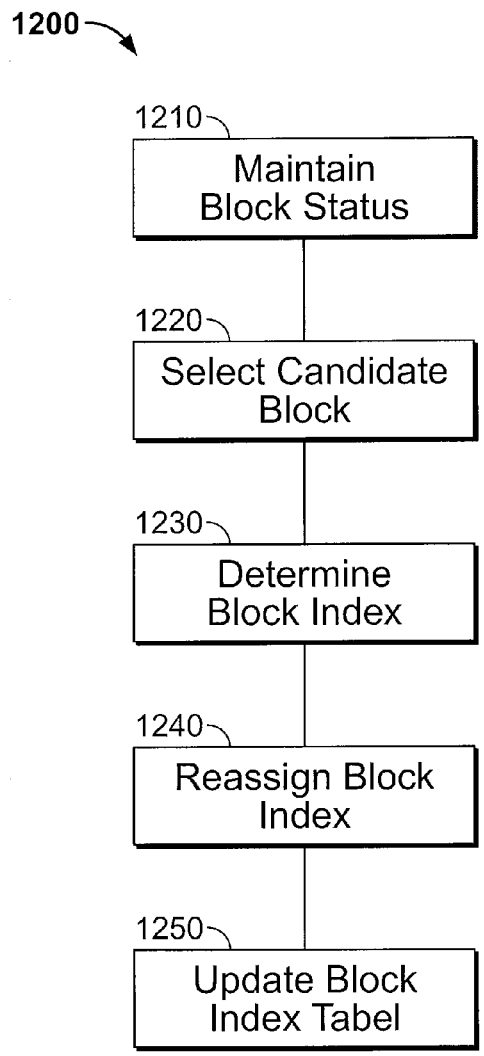
FIG. 9 is a portion of the garbage collection process for managing the assignment of physical blocks to virtual physical addresses when a free blocks is selected from the erased block pool.

An example of the selection of a block to which data is to be written is shown in FIG. 9. The status of each block is maintained 1210, for example, in a data structure such as shown in FIG. 3 so that each block may be characterized by the number of times that the block has previously been erased and the number of valid pages in the block. The time since the last erasure may also be maintained. Blocks are selected for garbage collection/wear leveling in accordance with a policy. For example, the blocks may be ranked using a function of the number of times the block has been erased, the time since last erasure, and the fraction of valid blocks such as $T(1-u)/(uN)$, where u is the fraction of the blocks that are valid (u>0). The block with the highest rank, for example, may be selected as the next block. More than one block may be selected so as to ensure a sufficient availability of free PBAs in the queue for assignment to write commands.

The candidate block is selected and erased 1220, or placed in a queue of blocks to be erased. The operation may be performed in advance of the need for the block such that there is no delay in allocating the block for use. Whether this occurs depends on the system dynamic performance under the actual workload.

The block index value selected is determined 1230 and exchanged with the block index of the free block 1240 that is being used to write the current new PBA. This operation may typically be interleaved with the data being moved from the block being reclaimed, so as to occupy a PBA that previously represented an obsolete page of data. The block index table is updated 1250 so that subsequent reads are directed to the proper physical location.

In an aspect, a WRITE2 command may be parameterized, for example, so as to omit some or all of the steps 1120 and 1130. For example, where the L2P table is being checkpointed to the memory system 100, contiguous LBA were previously stored to contiguous PBAs during the system initialization, either by writing a pattern to the blocks being used, or by an allocation mechanism. The checkpointing process may considered as writing a modified set of data on a page or multipage basis, where all of the data previously stored in a contiguous block of LBAs/PBAs is modified. Alternatively, the conventional process may be followed and only the pages having LBAs that have had modified PBAs may be written when the L2P table is checkpointed. That is, data which is effectively "read-only" will experience few changes in LBA/PBA associations in the L2P tables.

Figure 10:
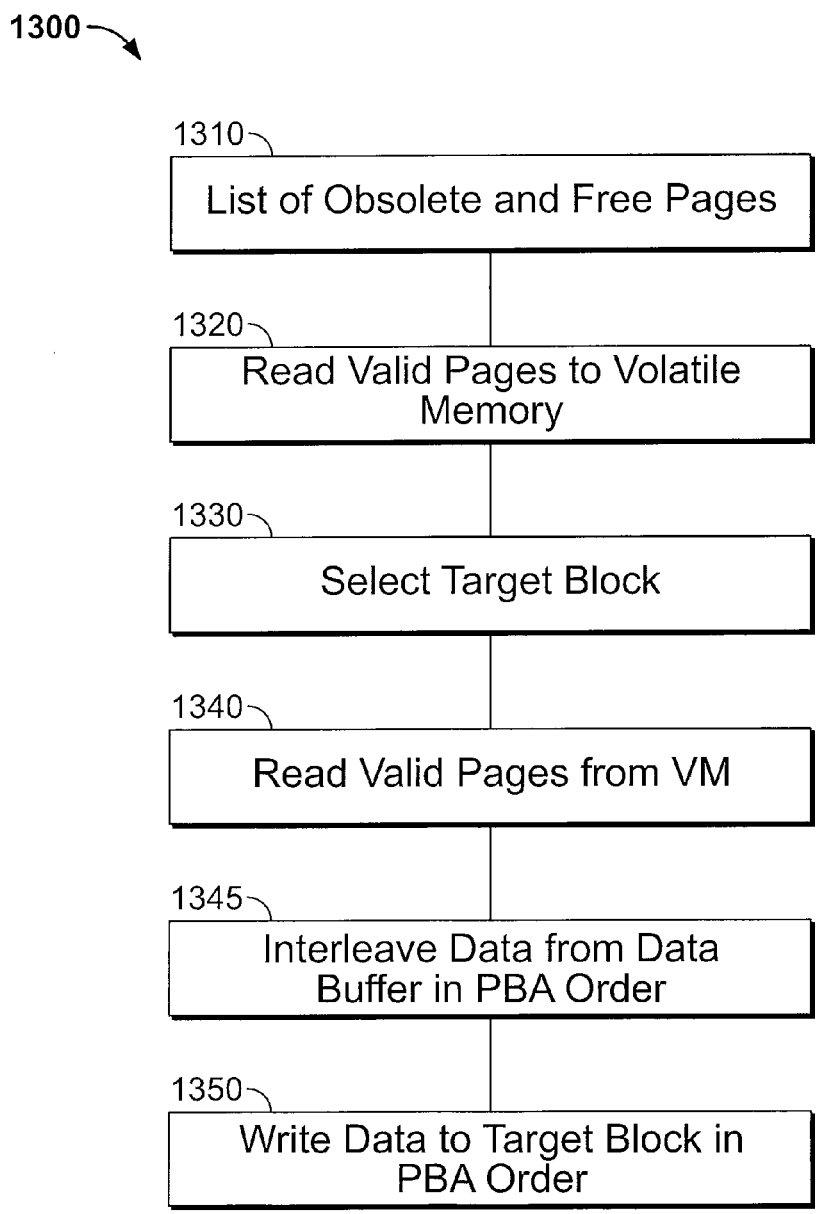
FIG. 10 is a portion of the garbage collection process in an example where the valid data may be maintained in a same relative physical location in the block with other data interspersed at locations that were either obsolete or free.

Blocks are prepared for reclamation and storing relocated valid data (if any) and modified data as shown in FIG. 10. For each block a bit map of the status of each page may be maintained such that the status is one of valid, obsolete, free (and possibly an unusable page if faults are managed on a page level). When the block is being prepared for erasure after being selected in accordance with the process of FIG. 9, the block bitmap is scanned to determine the pages to which new data may be written 1310. The available PBAs are assigned to data in the write data buffer 1340. As the valid data is being read from the block being reclaimed, the data having newly assigned PBAs is interspersed with the valid data in PBA sequence 1350 prior to writing the data to the new block. In this manner, all of the free memory locations of the new block are filled with valid data. Other methods of managing the tables are known and would be apparent to a person of skill in the art.

Figure 11:
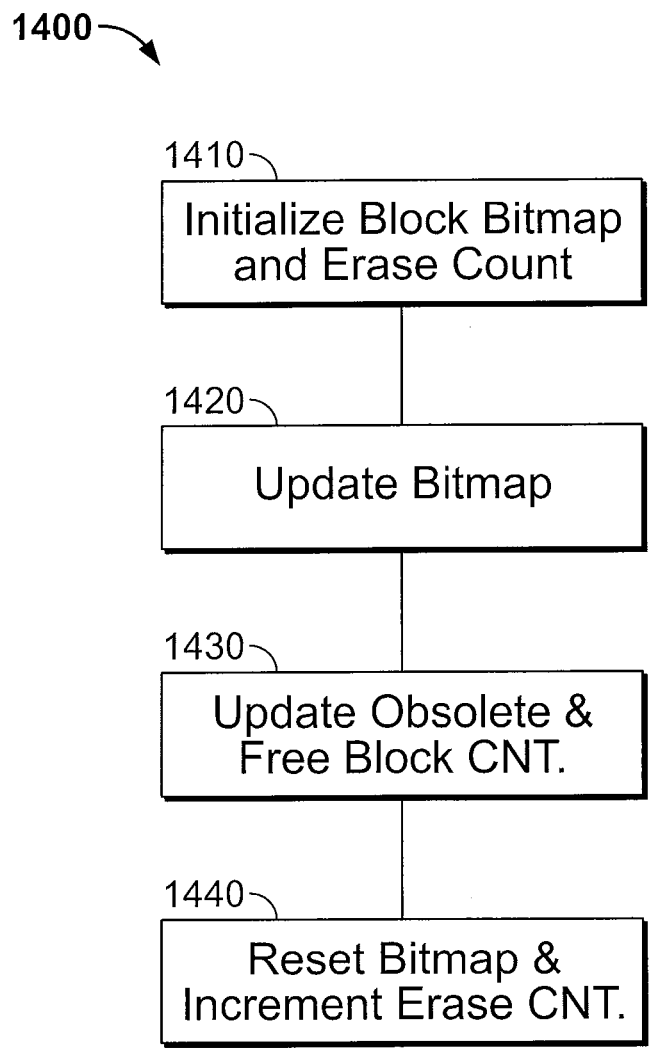
FIG. 11 is an example of using a bitmap as part of the management of garbage collection of the memory locations in a block.

FIG. 11 shows an example of a process 1400 for maintaining the bitmap for each block of data. A memory system 100, when placed in service, has the bitmap initialized 1410 so that each page is free and the erase count N is 0. When data is written to a page of the block, the corresponding bit is set to valid. Blocks are written in monotonically increasing page order; however, a block need not be completely filled (for example see. U.S. Ser. No. 12/796,836, entitled "Method and System for Persistent Garbage Collection," which was filed on Jun. 9, 2010, which is commonly assigned and is incorporated herein by reference). Writing to the block may be resumed at a later time. However, for simplicity of explanation, we presume that each page of the block is written with data. When data at a particular PBA has been accessed for writing, the data corresponding to the modified data will be stored at another PBA, so the page previously occupied by the data is obsolete, and the bitmap is updated 1420 to reflect the status. The valid block count is updated so that the value may be used in the selection process for block management.

The method described herein is representative of a simplified approach to managing the memory system 100 such that a limited amount of indirection performed in the memory system 100, and the size and complexity of the data structures in the memory system 100 is reduced. Moreover, the location of the L2P function in the host computer 5 may afford opportunities for higher level file system or application to exert some control over the placement of data in the memory system 100.

At some level in the management of the data being stored in the memory system 100, the actual physical location where the data is to be stored is based on some algorithmic relationship. This may be to take better advantage of parallelism in the operation of a plurality of flash memory chips, avoidance of congestion on local busses, error correction techniques such as RAID, or the like. For such operations, the needs of the higher level operations of the system 1 such as file management, are intrinsic to the design of the memory system 100 and may not be modifiable by external commands such as have been described.

However, some of the activities of the memory system 100 may be directed by higher level commands so as to better adapt the storage of data to the needs of the developer of, for example, a file system.

In an aspect, it may be considered desirable for data represented by consecutive LBAs to be stored in consecutive PBAs (where the PBAs are the physical addresses associated with the LBAs in the L2P table). Certainly this can occur when writing to a newly initialized memory system 100 as the PBA may be assigned in sequential order to the data as it is being written. After some time, however, when individual pages of data have been modified, the location of a contiguous block of LBAs may no longer be represented by a contiguous block of PBAs.

Compaction of the stored data may be performed by reading the data from a contiguous range of LBAs and rewriting the data (effectively writing modified data having the same value as the existing value) with a series of write commands without other interspersed commands. A contiguous range of PBAs may be obtained by starting such a series of writes with an erased page from the erased block pool. The write command may be parameterized to effect this operation. Moreover, as the data is not being modified during this reordering, the data itself need not be transferred over the transport mechanism 50. That is a series of LBA/PBA pairs may be moved to a contiguous range of PBAs in the memory system 100 and the resultant LBA/PBA pairs returned to the host computer 5 so as to update the L2P table.

Where the file system organization optimized assuming that the data are stored in blocks: that is, a number of pages equal to the number of pages in the block, and having PBAs falling in the same physical block, either blocks having all of the pages being valid may be selected from the erased block pool, or a service message returned to the file system. Such a write command may be characterized as a WRITE3 where, for example, the data payload is the LBA range and the corresponding list of associated PBAs determined from the L2P table. When the operation has been successfully completed, the acknowledgement message may contain the corresponding new list of PBA to which the data has been relocated.

Validity of the WRITE3 command may be determined by, for example, comparing the metadata of the first LBA/PBA pair with metadata received from the host (which may have been the LBA or a hash of the LBA or the data that had been stored).

In another aspect, a de-allocation command such as TRIM (as meant by the Windows and T13 committee), unmap (as described by the SCSI T10 committee) or a command having a similar effect which may be adopted in the future, may be used to designate pages having previously stored data that may no longer be needed by the using file system. However, whereas the conventional TRIM command is considered as a "hint" and need not be acted upon by the receiving device, as used here, such commands may be interpreted so as to cause the actions described below.

The data stored in pages that are no longer referenced by the using application is no longer of value and may be erased without relocation when a block is reclaimed by garbage collection or wear leveling operations. At the host computer 5, the TRIM command to a LBA is used to look up the corresponding PBA in the L2P table. The association between the LBA and the PBA being abandoned is used to formulate the TRIM command to be sent to the memory system 100. As this is being done, the abandoned PBA is deleted from the L2P table (or marked as obsolete). A subsequent writing of data to the LBA will result in a WRITE1, since the L2P table does not have a PBA previously assigned. A read command to the LBA will result in what is described herein as an error, at step 890. This response may also be a fixed data pattern (all "0" or all "1") depending on the specific system design and protocol. Thus a read command to a LBA not having an assigned PBA may not result in an interaction with the memory system.

When a TRIM command is sent to the memory system 100, the PBA corresponding to the LBA being abandoned is used to maintain the bitmap for each block 1400. Here, the page may be marked as obsolete, and it may be no longer required in memory. By doing this, pages having data that may no longer be needed by the using application may be discarded during a garbage collection or wear leveling operation without a need to relocate the data to another page. This reduces the write amplification associated with the housekeeping operations.

Unlike the T13 "TRIM" or T10 "unmap" commands which operate on logical address ranges, the unmap described herein may operate on physical address ranges associated with the TRIMed LBAs.

In another aspect, a plurality of memory circuits 200 or a plurality of memory modules 150 may be operated so as to effect at least one of erase hiding or RAID as described in U.S. Pat. No. 8,200,887 issued May 23, 2012, "Memory Management System and Method" which is commonly owned and which is incorporate herein by reference. A plurality of different memory circuits or memory modules may be operated so as to both distribute the data and commands over a number of data busses, processors and memories so as to improve the bandwidth of the system, reduce latency and provide redundancy.

In an aspect, a plurality of memory circuits 200 may be operated in a RAID configuration. In a simple configuration where there are, for example, five memory circuits 200 in a memory module and the data is stored as four stripes of data and one stripe of parity data.

Initially, for simplicity, we will ignore error processing. Each of the memory circuits 200 may have a number N of memory blocks, of which a predetermined fraction k is allocated to the user. Each block has a number of memory pages M. For each memory circuit, there may be a block allocation table such as shown in FIG. 3. Initially all of the block allocation tables are identical and the memory has all free blocks or erased blocks. So, only one block allocation table may be needed to relate the logical representation of the memory block having N pages to the physical location of the memory block. Again, for simplicity, one may consider that the logical representation of the memory blocks and the physical representation of the memory blocks are related in a one-to-one manner.

When data is received by the controller 160 of the memory module 150 accompanying a WRITE1 request, for example, a portion of the data is allocated to each of four pages in separate memory circuits 200 and a parity computed over the four data pages is computed and stored in the fifth page. Other combinations of blocks to store data and parity for the data may be used, from 2 data blocks and one parity block, to a large number of data blocks and one or more parity blocks. The selection of the configuration may be configurable so that varying user requirements may be satisfied. Generally as the RAID process is a lower level process in the memory system, a single LBA may map to the plurality of PBAs where the data and the parity data is stored, and the user-facing L2P table need not expose the mapping to the user.

Each page may be written to a separate memory circuit 200 and, in accordance with the system and method described above, a sequential memory location in each of the five memory circuits 200 is allocated to the data. In this instance, the first page of each of the memory circuits of the five memory circuits is selected. Alternatively, each page of user data may be divided into sectors and written to all of the memory blocks associated with a stripe of a RAID group.

Again, for simplicity of description, let us assume that the size of the logical block of data being written by the WRITE1 command is 8 KB, and the size of each of the M pages making up a memory physical block is 2 KB. So, the data may be allocated such that the first page of the first block of each of four memory circuits 200 is written with 2 KB of data and the first block of the fifth memory circuit is written with the parity data computer over the data pages.

The WRITE1 command, when executed, returns the "physical address" at which the data is stored. In this example, it would be the first physical block address in the first block of the memory circuit. Since the relationship is the same for all of the memory circuits, one may consider the address of the first of the 2 KB pages to be representative of the physical block address, modulo 8 KB.

The writing process may continue as necessary and the LBA/PBA table in the host computer 5 constructed. Absent error conditions, the association of a LBA with the five pages in the five memory circuits 200 is represented by the same table, as any action taken with respect to a first 2 KB increment of the LBA space is the same as that taken for the remainder of the 2 KB increments of the LBA space. The 2 KB parity data may not be made directly available to the user, but is used by the system for erase hiding and RAID purposes.

A person of skill in the art would recognize that a WRITE2 command would have an analogous process such that the corresponding physical locations in the memory circuits 200 would be written to fill in spaces reclaimed in the garbage collection process. A table similar to that in FIG. 3 would deal with the simple indirection that may be needed.

A person of skill in the art would recognize that when garbage collection is performed, as previously described, when a particular page in a memory circuit is deemed to the obsolete or otherwise unavailable, the corresponding page in the other of the group of memory circuits would be treated similarly. This is not a limitation; however, the function of the tables in FIG. 3 may be altered so that the block level indirection and possibly the page level indirection could be managed.

There arise occasions where a write operation fails or read errors rise to the level where a page or a block becomes unusable. For example, a write operation to a page one of the memory circuits of the five memory circuits fails. But, data was successfully written to four of the pages. The response to the WRITE command may already have been generated and sent to the host 5. The data is recoverable as either all of the data has been successfully written or less than all of the data has been successfully written, but the parity data has been successfully written. Alternatively, the data may still be cached in volatile memory 170 or elsewhere.

The entire block of data may be relocated to a spare or otherwise free block and the logical representation of the physical block updated so that the same PBA now points to the physical address where the data has been relocated. This means that there is no need to update the L2P table in the host, as the LBA/PBA association remains valid. The relocation may be managed by the block indirection table shown in FIGS. 3A, B.

When the memory module is operated in this manner, an erase hiding technique may be used at the memory module level by ensuring that only one of the five chips to which the write data block is being stored is performing a write operation or an erase at any one time. Thus a read operation may be performed without delay due to a concurrent write or erase operation, respectively, to a logical block address (LBA) located on the same chip plane, for example.

This approach may also be used at a higher level in the system where a memory controller 130 may be used to perform the allocation of data in a write operation to a plurality of memory modules 150 so as to achieve either a RAID or erase hiding configuration at the memory module level. Some or all of the functionality may be overlaid on the memory modules 150 which may be performing some or all of the functionality for the same or similar purpose within the memory modules.

At the level of the memory controller 150 a different logical scheme may be used so as to, for example, broadly stripe the data over the memory modules so as to further level the processing and bus loadings. A system and method of doing this is described in. U.S. Ser. No. 122/901,224, entitled "Memory System with Multiple Striping," filed on Oct. 8, 2010, which is commonly owned and is incorporated by reference herein. At any level, write operations may be combined so as to form complete 2 KB pages, for example, where the addresses having less than 8 KB granularity are serviced by reading the 8 KB page and extracting the data requested by the offset address. The metadata may be used as described above to ensure that the correct data is being read, In this description, data is often described as being stored in tables. However this term should be understood in a figurative sense as the data may be stored or managed in linked lists or other data structures that are appropriate for the system design as the LBA space may be sparsely allocated, may be represented by a combination of a logical unit number (LUN) and LBA, or the like.

Where the SSD maintains its own logical-to-physical mapping and a higher level management manages the logical address space for the purpose of performing some or all of the garbage collection the higher level functions may not need to be aware of specific physical addresses but may maintain a record of which logical addresses are in the same flash erase block. This can accomplished, for example, by returning the block address in response to a write command, but it can also be accomplished by indicating when a write was the last or the first write in an the old or the new block.

The higher level management function may be configured to also insure that addresses are in the same block by having a command or option on a write command instructing the SSD to begin writing into a new block.

The SSD may accept a command to query or to set the number of writes that may be needed to fill a block, so as to allow the higher level management function to match certain data structures or algorithm parameters.

The number of blocks that are written in parallel affects the performance characteristics of the SSD or memory as well as the size of the group of addresses are moved as a group or the associated tracking that may be needed to so as not move them as a group. The SSD may allow this parameter to be set or queried.

The number of blocks that are written in parallel affects the performance characteristics of the SSD as well as the size of the group of addresses are moved as a group or the associated tracking that may be needed to so as not move them as a group. The SSD may allow this parameter to be set or queried.

SSDs may accept all incoming writes as if coming from a single controller, but in order for two, or more, separate higher level management functions to simultaneously use an SSD while tracking which logical addresses are in the same blocks for the purpose of managing the garbage collection, the SSD may operate multiple pools of blocks, or multiple write streams, or other means of allowing writes from different control functions to be written to different flash blocks. Each of these pools/streams or other means of tracking different control functions may have their own settings parameters and controls. In an aspect, the different block pools may share a common erased block pool.

In another aspect, the command interface to the architecture described above may be established a one or more levels, depending on the application or the functionality desired. The interface may in the form of an Application Programming Interface (API), an extension or modification or adaptation of an industry standard protocol such as SCSI, or the like. In some embodiments, the use may either allow or deny access to physical memory location data.

While the methods disclosed herein have been described and shown with reference to particular steps performed in a particular order, it will be understood that these steps may be combined, sub-divided, or reordered to from an equivalent method without departing from the teachings of the present invention. Accordingly, unless explicitly stated, the order and grouping of steps is not a limitation of the present invention.

Certain aspects, advantages, and novel features of the claimed invention have been described herein. It would be understood by a person of skill in the art that not all advantages may be achieved in practicing a specific embodiment. The claimed invention may be embodied or carried out in a manner that achieves or optimizes one advantage or group of advantages as taught herein without necessarily achieving other advantages as may have been taught or suggested It is therefore intended that the foregoing detailed description be regarded as illustrative rather than limiting, and that it be understood that it is the following claims, including all equivalents, that are intended to define the spirit and scope of this invention

What is claimed is:

1. A method of managing storage of data, including:
providing a nonvolatile memory device for storing data, the non-volatile memory device having a processor, volatile memory and non-volatile memory the processor capable of accepting a first type of read command and a second type of read command; and
configuring the processor for:
interpreting a read data command from a user to determine whether the read data command is a first type of read data command or a second type of read data command, and
wherein, the read data command is of the first type when the command includes a logical address and does not include a physical address in the nonvolatile memory at which the data is stored;
the read data command is of the second type when the read data command includes at least the physical address in the nonvolatile memory at which the data is stored in memory; and,
responsive to the first type of read data command, determining the physical address of the data, retrieving data from the physical address in the nonvolatile memory and returning the data to the user; or
responsive to the second type of read command retrieving data from the physical address in the nonvolatile memory and returning the data to the user,
wherein a relationship between the logical address and the physical address is maintained in an indirection table in the nonvolatile memory device.

2. The method of claim 1, further comprising:
reading metadata for retrieved data;
comparing at least a portion of the metadata for retrieved data with at least a portion of metadata in the first or the second type of read command: and
either,
returning the retrieved data to the user if the portions of the metadata of retrieved data and the metadata of the first or the second type of read command match; or,
returning an error message to the user if the portions of the metadata of retrieved data and the metadata of the first or the second type of read command do not match.

3. A method of managing data storage in a memory, including:
  providing a nonvolatile memory device for storing data, the non-volatile memory device having a processor, volatile memory and non-volatile memory;
  configuring the processor for:
    interpreting a write command from a user to determine whether the write command is a first type or a second type,
      wherein the write command is of the first type when the command includes a logical address and does not include a physical address where the data is to be stored; and
    the write command is of the second type when the write command includes at least a physical address at which the data is stored in the nonvolatile memory; and,
    responsive to the write command of the first type, determining the physical address in the nonvolatile memory where data associated with the write command of the first type is to be stored in the nonvolatile memory, in accordance with a protocol, and associating the physical address with the logical address in an indirection table; and
    responsive to the write command of second type, determining a physical address in the nonvolatile memory where data associated with the write command of the second type is to be stored, in accordance with a protocol, and including the physical address in a response message to the user,
  wherein the indirection table is maintained in the non-volatile memory device.

4. The method of claim 3, further comprising:
  writing data associated with the first or the second type of write command to the nonvolatile memory; and
  writing metadata associated with the first or the second type of write command to the nonvolatile memory device.

5. The method of claim 3, further comprising:
  using metadata of the second type of write command; and
  comparing a portion of the metadata of the second type of write command with a portion of the metadata associated with the data stored at the physical address in the nonvolatile memory provided in the second type of write command; and,
    performing the step of determining a physical address responsive to the second type of write command if the portion of the metadata of the second type write command matches the portion of the metadata stored at the physical address in the nonvolatile memory specified by the second type of write command; or
    returning an error message to the user if the portion of the metadata of the second type of write command does not match the portion of the metadata stored at the physical address specified by the second type of write command.

6. The method of claim 3, further comprising:
  determining if second type of write command includes a logical address, and using the logical address as a portion of the metadata stored for the determined physical address, or
  determining if the second type of write command does not include the logical address, and providing the logical address, associated with determined physical address, in a response message to a user; and
  storing the provided logical address as metadata.

7. The method of claim 3, wherein the metadata includes at least one of the logical address, a hash of the data stored at the logical address, a sequence number, or a time value.

8. The method of claim 3, wherein the non-volatile memory is comprised of storage locations having physical addresses, groups of storage addresses comprising a block of memory of the plurality of blocks of memory of the nonvolatile memory, having a characteristic that the block of memory can be written once before being entirely erased.

9. The method of claim 8, wherein a plurality of blocks form a group of blocks and the group of blocks are associated with one of a logical address range or a physical address range.

10. A device for storing data, comprising:
  a nonvolatile semiconductor memory, the memory being organized as blocks, each block comprising a plurality of physical locations where a data is storable;
  a processor having an associated buffer memory and communicating with a data interface and the nonvolatile semiconductor memory;
  wherein the processor is configured to receive commands through the data interface and to manage storage of data in the nonvolatile semiconductor memory; and to
  interpret a read data command from a user to determine whether the read data command is a first type of read data command or a second type of read data command,
  wherein the read data command is of the first type when the command includes a logical address and does not include a physical address;
  the read data command is of the second type when the command includes at least a physical address at which the data is stored in memory; and,
    responsive to the first type of read data command, determine the physical address of the data, retrieve data from the physical address in the non-volatile memory and return the data to the user; or
    responsive to the second type of read command, retrieve data from the physical address in the non-volatile memory and return the data to the user,
      wherein a relationship between the logical address and the physical address is maintained in an indirection table.

11. The device of claim 10, further comprising:
  the processor configured to:
    read metadata for retrieved data;
    compare at least a portion of the metadata of retrieved data with at least a portion of metadata in the first or the second type of read command: and
    either,
      return the retrieved data to the user if the portions of the metadata of retrieved data and the metadata of the first or the second type of read command match; or,
      return an error message to the user if the portions of the metadata of retrieved data and the metadata of the first of the second type of read command do not match.

12. The device of claim 11, further comprising:
  the processor configured to:
    interpret a write data command from the user to determine whether the write data command is of the first type or the second type;
      wherein the write data command is of the first type when the command includes the logical address and does not include a physical address where the data is to be stored; and
    the write data command is of the second type when the command includes at least a physical address at which the data is stored in memory; and,
    responsive to the command of the first type, determine the physical address in the non-volatile semiconductor memory where data associated with the first type of write data command is to be stored, in accordance with a protocol, and associate the physical address with the logical address in an indirection table; or, responsive to the command of the second type, determine a physical address in the non-volatile semiconductor memory where data associated with the second type of write data command is to be stored, in accordance with a protocol, and include the physical address in a response message to the user.

13. The device of claim 12, further comprising:
the processor configured to:
write data associated with the command of the first or the second type to the nonvolatile semiconductor memory; and
write metadata associated with the command of the first or the second to the nonvolatile semiconductor memory device.

14. The device of claim 11, further comprising:
the processor configured to:
compare a portion of the metadata of the command of the second type with a portion of the metadata associated with the data stored at the physical address provided in the second type of write data command; and,
perform the step of determining a physical address responsive to the command of the second type if the portion of the metadata of the command of the second type matches the portion of the metadata stored at the physical address of the command of the second type; or
return the error message to the user if the portion of the metadata of the command of the second type does not match the portion of the metadata stored at the physical address of the command of the second type.

15. The device of claim 11, further comprising:
the processor configured to:
determine if second type of write data command includes a first logical address, and use the first logical address as a portion of the metadata, or
determine if the second type of write data command does not include a first logical address, and provide a second logical address, associated with the determined physical address, in a response message to the user; and
store the second logical address as metadata for the data.

16. The device of claim 11, wherein the metadata includes at least one of the logical addresses, a hash of the data stored at the one of the logical addresses, a sequence number, or a time value.

17. The device of claim 11, wherein the non-volatile semiconductor memory is comprised of storage locations having physical addresses, groups of storage addresses comprising a block of memory, and having a characteristic that a block of memory can be written once before being entirely erased.

18. The device of claim 17, wherein a plurality of blocks form a group of blocks and the group of blocks are associated with one of a logical address range or a physical address range.

19. The device of claim 11, further comprising:
the processor configured to:
receive a TRIM command from the user, the TRIM command identifying at least one physical address to be disassociated from a corresponding logical address in the indirection table; and
set a status of the physical address associated with the logical address in the indirection table to invalid; and
disassociate the physical address from the logical address.

20. The device of claim 19, wherein the TRIM command includes a base logical block address and an extent.

21. The device of claim 20, wherein metadata of the extent, included in the TRIM command is compared with the metadata of the at least one physical address of the extent the physical address is status is set to invalid and the physical address is dissociated from the logical address when the metadata matches.

* * * * *